US011118526B2

(12) United States Patent
Fujisaki et al.

(10) Patent No.: US 11,118,526 B2
(45) Date of Patent: Sep. 14, 2021

(54) COMBUSTION ABNORMALITY DETECTING DEVICE AND NON-TRANSITORY COMPUTER-READABLE STORAGE MEDIUM

(71) Applicant: MIKUNI CORPORATION, Tokyo (JP)

(72) Inventors: Satoru Fujisaki, Iwate (JP); Katsuhiko Fukui, Iwate (JP)

(73) Assignee: MIKUNI CORPORATION, Tokyo (JP)

( * ) Notice: Subject to any disclaimer, the term of this patent is extended or adjusted under 35 U.S.C. 154(b) by 39 days.

(21) Appl. No.: 16/810,857

(22) Filed: Mar. 6, 2020

(65) Prior Publication Data

US 2020/0309056 A1 Oct. 1, 2020

(30) Foreign Application Priority Data

Mar. 27, 2019 (JP) ............................ JP2019-059540

(51) Int. Cl.

| | |
|---|---|
| ***F02D 41/22*** | (2006.01) |
| ***F02D 41/26*** | (2006.01) |
| ***F02D 41/14*** | (2006.01) |
| *F02D 41/20* | (2006.01) |

(52) U.S. Cl.

CPC ......... *F02D 41/22* (2013.01); *F02D 41/1498* (2013.01); *F02D 41/26* (2013.01); *F02D 2041/1409* (2013.01); *F02D 2041/1432* (2013.01); *F02D 2041/2058* (2013.01); *F02D 2200/1015* (2013.01)

(58) Field of Classification Search

CPC ...... F02D 41/22; F02D 41/1498; F02D 41/26; F02D 2041/1409; F02D 2041/1432; F02D 2041/2058; F02D 2200/1015

See application file for complete search history.

(56) References Cited

U.S. PATENT DOCUMENTS 10,247,633 B2 * 4/2019 Shibata ............... G01L 19/0681

FOREIGN PATENT DOCUMENTS

| | | |
|---|---|---|
| JP | S62118031 | 5/1987 |
| JP | H07139416 | 5/1995 |

* cited by examiner

*Primary Examiner* — Hieu T Vo
(74) *Attorney, Agent, or Firm* — JCIPRNET

(57) ABSTRACT

The disclosure provides a combustion abnormality detecting device, a combustion abnormality detecting method, and a non-transitory computer-readable storage medium, a misfire detection accuracy is increased by increasing a piezoelectric detection accuracy. A charge amplifier (210) outputting a voltage signal corresponding to a charge generated by a piezoelectric element (35) in response to a received pressure, a drift component extracting part (230) extracting a drift component of the piezoelectric element (35), a drift correcting part (250) generating a correction signal for removing the drift component based on the extracted drift component and feeding back the correction signal to an input side of the charge amplifier (210), and a misfire detecting part (400) performing misfire detection based on the correction signal are included.

13 Claims, 14 Drawing Sheets

300
10 30 12 9 40 24 8 15 2 6 1 3 4 100 7 20 5 22
ECU (a)

(b)

(c)

(a)

(b)

COMBUSTION ABNORMALITY DETECTING DEVICE AND NON-TRANSITORY COMPUTER-READABLE STORAGE MEDIUM

CROSS-REFERENCE TO RELATED APPLICATION

This application claims the priority benefit of Japan application serial No. 2019-059540, filed on Mar. 27, 2019. The entirety of the above-mentioned patent application is hereby incorporated by reference herein and made a part of this specification.

BACKGROUND

Technical Field

The disclosure relates to a combustion abnormality detecting device, a combustion abnormality detecting method, and a non-transitory computer-readable storage medium storing a program capable of detecting a misfire occurrence.

Description of Related Art

As a device for detecting a misfire state in which the combustion of the engine of an automobile, etc., is not performed normally, a device for carrying out detection based on a signal generated in response to the rotation of a crank shaft has been proposed. For example, according to the misfire detecting device disclosed in Patent Document 1, the intervals of a plurality of pulse signals generated for each rotation of the crank shaft are measured, the maximum value of the rotation variations of the crank shaft is determined based on the time variations of the measured pulse signal intervals, and a misfire determination is performed based on the determined maximum value and the total number of pulse signals in the predetermined interval (see Patent Document 1).

However, in the misfire detecting device disclosed in Patent Document 1, a sensor generating a pulse for each rotation of a cam shaft is required in addition to a crank angle sensor generating the pulse signals for each rotation of the crank shaft.

Besides, in general, in the case where misfire detection is performed based on the signals generated in response to the rotation of the crank shaft, there is a possibility of performing erroneous detection as the signals generated in response to the rotation of the crank shaft fluctuate due to torsional vibration of the crank shaft, etc., resulting from traveling on an irregular road surface.

Accordingly, a device that detects the misfire state of the engine based on a pressure signal in a cylinder has also been proposed. For example, according to the disclosure of Patent Document 2, a pressure signal obtained by an in-cylinder pressure sensor is sampled, a combustion temperature is calculated from a gas state formula based on the sampled pressure signal, and misfire detection is performed based on a difference between the calculated combustion temperature and a theoretical combustion temperature stored in an operation map.

RELATED ART DOCUMENT(S)

Patent Document(s)

[Patent Document 1] Japanese Laid-Open No. 62-118031 (pages 1 to 7, FIG. 2)

[Patent Document 2] Japanese Laid-Open No. 7-139416 (pages 2 to 4, FIG. 3)

However, in the misfire detecting device disclosed in Patent Document 2, as the combustion temperature calculation executed when determining a misfire is executed assuming that the gas in the cylinder follows the ideal gas state formula, a misfire detection error may occur particularly at the time of idling. In addition, constructing the operation map defining the theoretical combustion temperature requires enormous man-hours.

The disclosure provides a combustion abnormality detecting device, a combustion abnormality detecting method, and a program which, with a simple configuration, increase the pressure detection accuracy as well as increasing the accuracy for combustion abnormality detection, such as misfire detection.

SUMMARY

In an exemplary embodiment of the disclosure, a combustion abnormality detecting device according to the disclosure detects an occurrence of a combustion abnormality of an internal combustion engine based on a signal obtained by performing a signal processing on an output signal of a pressure sensor including a piezoelectric element generating a charge responsive to a received pressure, and includes: a charge amplifier, outputting a voltage signal corresponding to the charge; a drift component extracting part, extracting a drift component of the piezoelectric element based on the voltage signal; a drift correcting part, generating a correction signal for removing the extracted drift component and feeding back the correction signal to an input side of the charge amplifier; and a combustion abnormality detecting part, detecting that the combustion abnormality occurs based on the correction signal.

In the device, it can be configured that the combustion abnormality detecting part detects an occurrence of a misfire as the combustion abnormality based on a variation of a value of the correction signal.

More specifically, it can be configured that the combustion abnormality detecting part detects the occurrence of the misfire based on a variation amount of the value of the correction signal in a negative direction and a first misfire occurrence reference value set in advance. In addition, it may also be that the combustion abnormality detecting part detects the occurrence of the misfire based on a temporal variation rate of the value of the correction signal and a second misfire occurrence reference value set in advance.

A resistance value of the piezoelectric element has a negative temperature property. For example, a material of the piezoelectric element is ZnO (zinc oxide).

In addition, the drift component extracting part includes a differential processing part, performing a differential process with respect to the voltage signal, and a low-pass filter, extracting a low frequency band component of a signal subjected to the differential process.

In addition, it may also be configured that the drift correcting part includes a registering part associating a current value of the correction signal to be fed back in the drift component with each of a plurality of values which the drift component is able to obtain and registering the current value, obtains the current value associated with the extracted drift component by referring to registered contents of the registering part, and feeds back a current signal to the input side of the charge amplifier, wherein the current signal is equivalent to the obtained current value and regarded as the correction signal, and the combustion abnormality detecting part detects the occurrence of the misfire based on the current signal.

According to another aspect of the disclosure, as a device detecting an occurrence of a combustion abnormality of an internal combustion engine based on a signal obtained by performing a signal processing with respect to an output signal of a pressure sensor including a piezoelectric element generating a charge responsive to a received pressure, a charge amplifier outputs a voltage signal corresponding to the charge, a drift component extracting part extracts a drift component of the piezoelectric element based on the voltage signal, a drift correcting part generates a correction signal for removing the extracted drift component and feeds back the correction signal to an input side of the charge amplifier, and the occurrence of the combustion abnormality is detected based on a signal generated based on the extracted drift component and serving for generating the correction signal.

It can be configured that the combustion abnormality detecting part detects an occurrence of a misfire as the combustion abnormality based on a variation of a value of the signal generated based on the extracted drift component. In addition, it may also be configured to further include a temperature estimating part estimating a temperature inside the internal combustion engine based on the signal generated based on the extracted drift component.

A non-transitory computer-readable storage medium storing a program of the disclosure is a program for realizing, in a combustion abnormality detecting device detecting an occurrence of a combustion abnormality based on a signal obtained by performing a signal processing with respect to an output signal of a pressure sensor including a piezoelectric element generating a charge responsive to a received pressure, an extracting function, a correcting function and a detecting function. The extraction function extracts a drift component of the piezoelectric element based on a voltage signal corresponding to the charge from a charge amplifier outputting the voltage signal. The correcting function generates a correction signal for removing the extracted drift component and feeds back the correction signal to an input side of the charge amplifier. The detecting function detects a combustion abnormality of an internal combustion engine based on the correction signal.

DESCRIPTION OF THE EMBODIMENTS

Embodiments of the disclosure will be described below with reference to the drawings. The embodiment of the disclosure described below is an example, the disclosure is not limited to the following embodiments, and various modifications and changes can be made to the following embodiments.

In the following, "the outline of an engine control system 300", "the functional configuration of an ECU 100", "the configuration of a pressure detection signal processing device 200", and "the principle, configuration, operation of misfire detection" are described in order.

According to the disclosure, the effect of being capable of providing a combustion abnormality detecting device, a combustion abnormality detecting method, and a program which, with a simple configuration, increase the pressure detection accuracy as well as improving the accuracy for combustion abnormality detection, such as misfire detection, is obtained.

In an exemplary embodiment of the disclosure, a method is a combustion abnormality detecting method detecting an occurrence of a combustion abnormality based on a signal obtained by performing a signal processing with respect to an output signal of a pressure sensor including a piezoelectric element generating a charge responsive to a received pressure. The combustion abnormality detecting method includes: a step for extracting a drift component of the piezoelectric element based on a voltage signal corresponding to the charge from a charge amplifier outputting the voltage signal; a step for generating a correction signal for removing the extracted drift component and feeding back the correction signal to an input side of the charge amplifier; and a step for detecting a combustion abnormality of an internal combustion engine based on the correction signal.

In an exemplary embodiment of the disclosure, a method according to another aspect of the disclosure is a combustion abnormality detecting method detecting an occurrence of a combustion abnormality of an internal combustion engine based on a signal obtained by performing a signal processing with respect to an output signal of a pressure sensor including a piezoelectric element generating a charge responsive to a received pressure. The method includes: a step for extracting a drift component of the piezoelectric element based on a voltage signal corresponding to the charge from a charge amplifier outputting the voltage signal; a step for generating a correction signal for removing the extracted drift component and feeding back the correction signal to an input side of the charge amplifier; and a step for detecting that the combustion abnormality occurs based on a signal generated based on the extracted drift component and serving for generating the correction signal.

(Outline of the Engine Control System 300)

Figure 1:
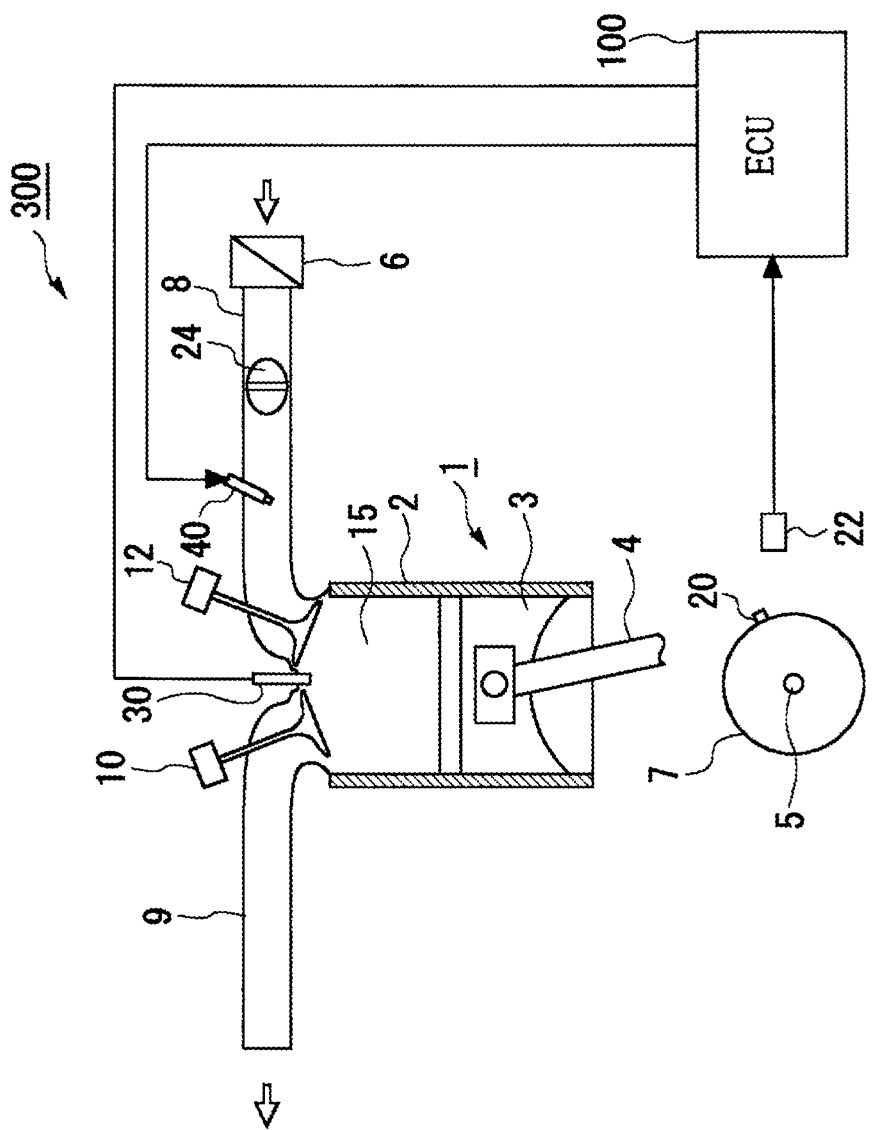
FIG. 1 is a schematic explanatory view illustrating a configuration of an engine control system 300.

FIG. 1 is a schematic view illustrating a configuration of the engine control system 300 including an engine 1 and the electric control unit (ECU) 100. The engine control system 300 performs engine control by using a pressure detection signal subjected to a signal processing by the pressure detection signal processing device 200. The "pressure detection signal" is an output signal from a pressure sensor 30. To facilitate the understanding, the spark plug is omitted from the illustration of FIG. 1.

The engine 1 has a cylinder 2 and a piston 3 fit inside the cylinder 2 to be vertically slidable. One end side of a connecting rod 4 is connected with the piston 3, and the other end side of the connecting rod 4 is connected with a crank shaft 5. A flywheel 7 is rotatably connected with an end part of the crank shaft 5 on a transmission side that is not shown. In a predetermined angular region on the outer periphery of the flywheel 7, a reluctor (reluctance rotor) 20 that is a protrusion made of a magnetic body is formed.

An electromagnetic pickup 22 disposed opposite to the crank shaft 5 outputs a positive voltage pulse when the reluctor 20 approaches, and outputs a negative voltage pulse when the reluctor 20 moves away. By shaping the pulse using a conventional pulse shaping circuit, so as to output one rectangular pulse based on positive and negative pulse signals, one rectangular pulse is output at each rotation of the flywheel 7.

Accordingly, in one cycle of "intake→compression→combustion→exhaust", since the crank shaft 5 rotates 720°, a rectangular signal (engine rotation signal) of two pulses is output from the electromagnetic pickup 22 in one cycle. Thus, the electromagnetic pickup 22 serves as a crank angle sensor detecting the rotation angle of the crank shaft 5.

As a result, the rotation speed of the engine 1 can be obtained based on the engine rotation signal from the electromagnetic pickup 22. In addition, the timing at which fuel is ignited can be set at a desired timing by setting the forming location of the reluctor 20 on the outer periphery of the flywheel 7 in an appropriate angular region and supplying an ignition control signal to the spark plug based on the engine rotation signal from the electromagnetic pickup 22. The desired timing is a timing corresponding to the top dead center (TDC), the advanced angle (before top dead center (BTDC)) side with respect to the top dead center, or the delayed angle (after top dead center (ATDC)) side with respect to the top dead center.

In addition, an intake pipe 8 and an exhaust pipe 9 are connected with the cylinder head of the top part of the cylinder 2. The inside of the intake pipe 8 serves as an intake passage for taking fresh air from the outside into a combustion chamber 15. In addition, from the upstream side, an air cleaner 6 for removing dust, etc., of the fresh air, a throttle valve 24 for adjusting the intake amount of fresh air, and an injector 40 for performing fuel injection, etc., are disposed in the intake passage. Then, the timing of taking fresh air into the combustion chamber 15 is controlled through a valve-opening/valve-closing operation of an intake valve 12 urged by a spring not shown herein in a valve-closing direction.

Then, the pressure sensor 30 detects a combustion pressure which is the pressure of the combustion chamber 15, and outputs a pressure detection signal indicating the detected combustion pressure. The pressure sensor 30 is disposed at the top part of the cylinder head in a posture that the tip of the pressure sensor 30 faces the inside of the combustion chamber. The location at which the pressure sensor 30 is mounted is not limited to the location shown in FIG. 1. Similarly, the spark plug not shown herein is disposed at a suitable location of the cylinder head in a posture that the tip of the spark plug faces the inside of the combustion chamber. A structure in which the pressure sensor 30 is integrally disposed inside the spark plug can be configured, or it can also be configured that the pressure sensor 30 and the spark plug are disposed separately.

On the other hand, the inside of the exhaust pipe 9 serves as an exhaust passage for exhausting exhaust gas from the combustion chamber 15. Then, the timing of exhausting exhaust gas from the combustion chamber 15 is controlled through a valve-opening/valve-closing operation of an exhaust valve 10 urged by a spring not shown herein in a valve-closing direction.

Signals from the electromagnetic pickup 22 and the pressure sensor 30, etc., are input to the ECU 100 controlling the operation of the engine 1. From the electromagnetic pickup 22, the rectangular pulse signal responsive to the rotation of the engine is input. The pressure detection signal is input from the pressure sensor 30. On the other hand, the ECU 100 controls fuel injection of the injector 40 and controls ignition of the spark plug.

Then, the pressure detection signal from the pressure sensor 30 is subjected to a signal processing by the pressure detection signal processing device 200. The ECU 100 performs control on fuel injection (injection amount, injection period) by the injector 40 and an ignition period by the spark plug based on the engine rotation signal and the pressure detection signal subjected to a signal processing by the pressure detection signal processing device 200.

The reciprocal movement in the vertical direction of the piston 3 inside the cylinder 2 is converted into a rotation movement of the crank shaft 5. The rotation movement of the crank shaft 5 is transmitted to a driving wheel via a transmission. Thus, by repeating the course of "intake→compression→combustion→exhaust", a vehicle (one with two wheels, four wheels, etc.) is moved forward.

In addition, FIG. 1 is a configuration example of the engine 1 and the ECU 100 controlling the engine 1. For example, the ECU 100 can be configured to perform control on the engine 1 by referring to the intake temperature, the cooling water temperature, the oxygen concentration in the exhaust gas, the opening degree of the throttle, etc., of the engine 1 in addition to the engine rotation signal and the pressure detection signal.

(Functional Configuration of the ECU 100)

Figure 2:
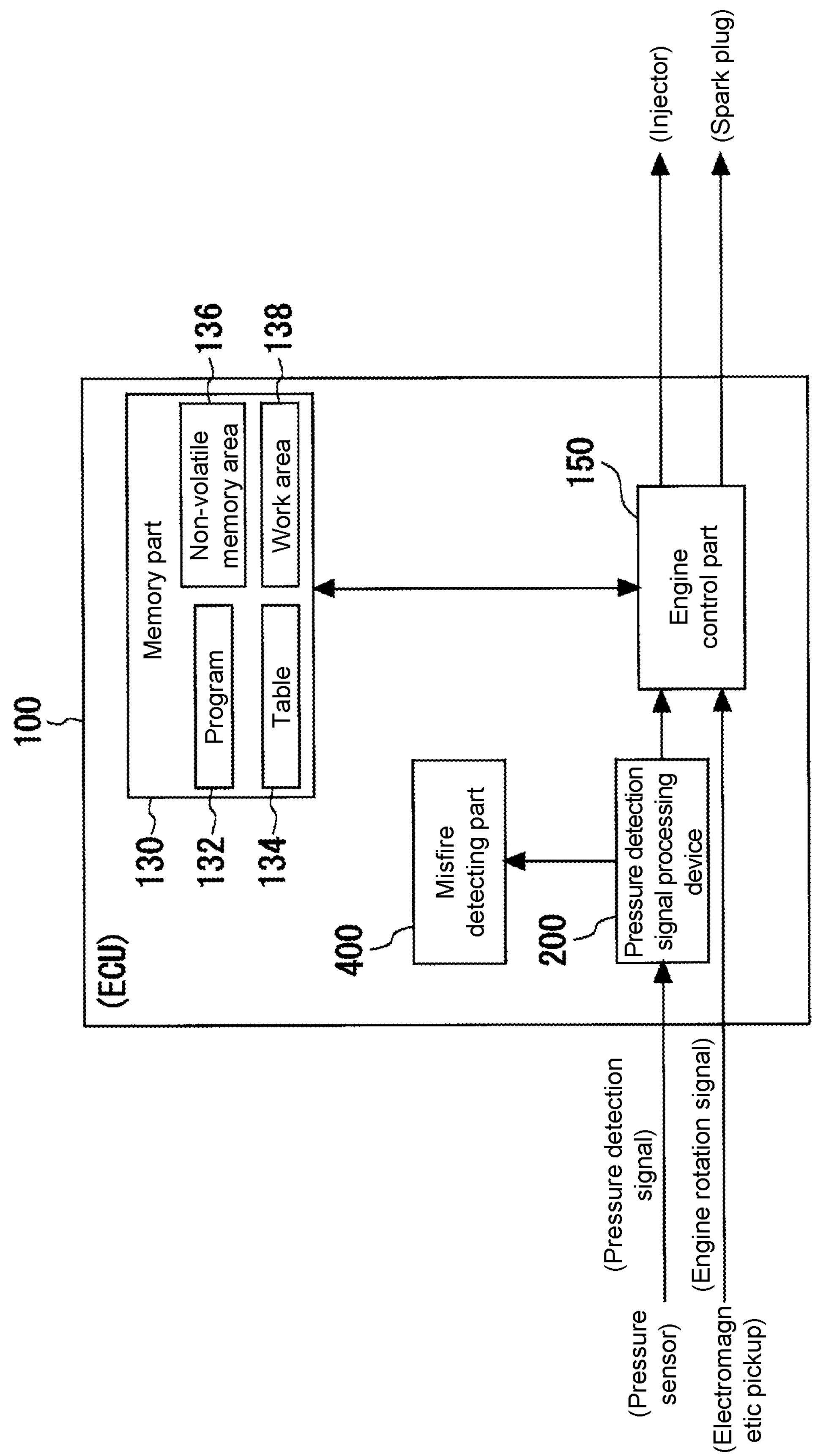
FIG. 2 is a diagram illustrating a functional configuration of an ECU 100.

FIG. 2 is a functional configuration diagram illustrating the function of the ECU 100. The ECU 100 has a memory part 130, an engine control part 150, a pressure detection signal processing device 200, and a misfire detecting part 400.

The memory part 130 has a program 132, a table 134, a non-volatile memory area 136, and a work area 138. The memory part 130 is a non-transitory computer-readable storage medium for storing the program 132, for example. The work area 138 is a temporary storage area for temporarily storing various parameters in a calculation process, etc., and the non-volatile storage area 136 is a storage area for storing various parameters used in calculation in a non-volatile manner.

The engine control part 150 obtains the fuel injection amount based on the pressure detection signal output from the pressure detection signal processing device 200, etc., and supplies a fuel injection signal responsive to the obtained fuel injection amount to the injector 40 at a timing based on the engine rotation signal from the electromagnetic pickup 22. The injector 40 injects fuel in the fuel injection amount responsive to the fuel injection signal supplied from the engine control part 150.

The engine control part 150 determines the ignition period based on the engine rotation signal from the electromagnetic pickup 22 and controls the spark plug. In addition, the engine control part 150 can control the ignition period based on the pressure detection signal from the pressure detection signal processing device 200 in addition to the engine rotation signal from the electromagnetic pickup 22.

Then, the misfire detecting part 400 performs misfire detection based on the signal output from the pressure detection signal processing device 200. The configuration, operation, etc., of the misfire detecting part 400 will be described in subsequent paragraphs.

In addition, the functional configuration of the ECU 100 shown in FIG. 2 is merely an example. The ECU 100 may be provided with functional configurations other than the example. As an example, the pressure detection signal after the signal processing output from the pressure detection signal processing device 200 is applicable for detection, control, etc., of various parameters such as knocking detection, misfire detection, combustion speed calculation, in addition to fuel injection control and ignition period control.

(Configuration of the Pressure Detection Signal Processing Device 200)

Figure 3:
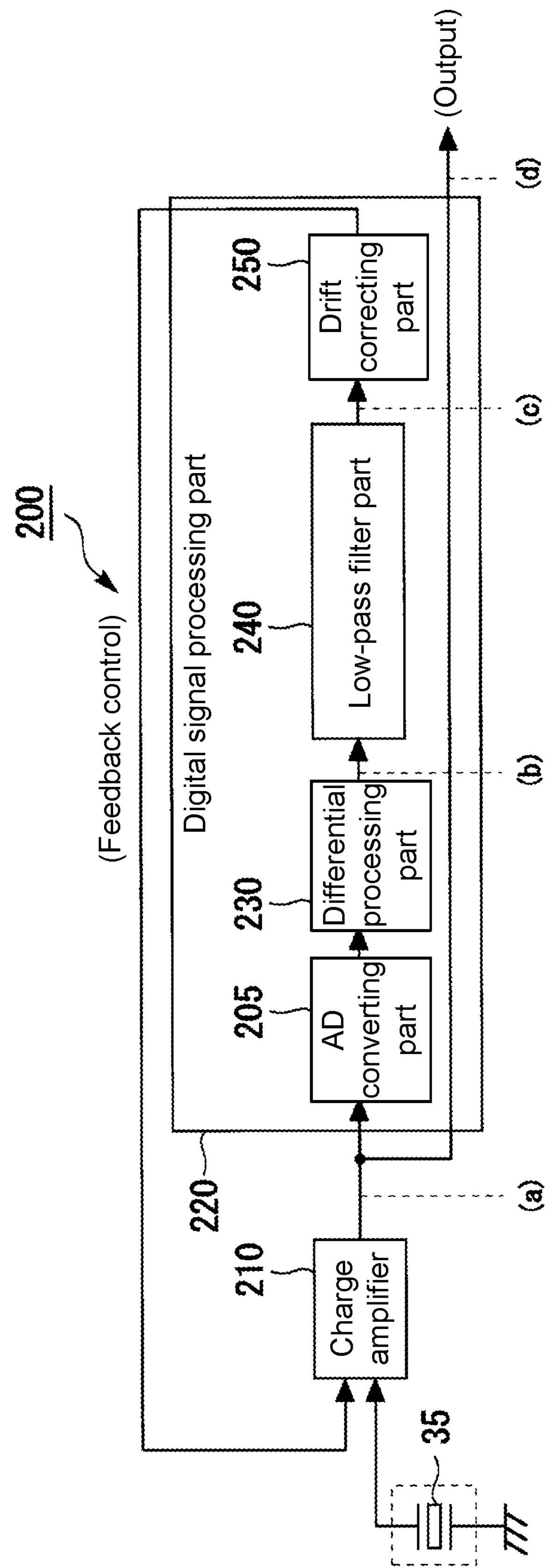
FIG. 3 is a diagram illustrating a configuration of a pressure detection signal processing device 200.

FIG. 3 is a diagram illustrating a configuration of the pressure detection signal processing device 200. The pressure detection signal processing device 200 has a charge amplifier 210 and a digital signal processing part 220. The digital signal processing part 220 has an AD converting part 205, a differential processing part 230, a low-pass filter part 240, and a drift correcting part 250, and is a configuration where a correction signal from the drift correcting part 250 is fed back to the input side of the charge amplifier 210. The output signal of the charge amplifier 210 is configured as being supplied to the digital signal processing device 220 and the engine control part 150.

Figure 4:
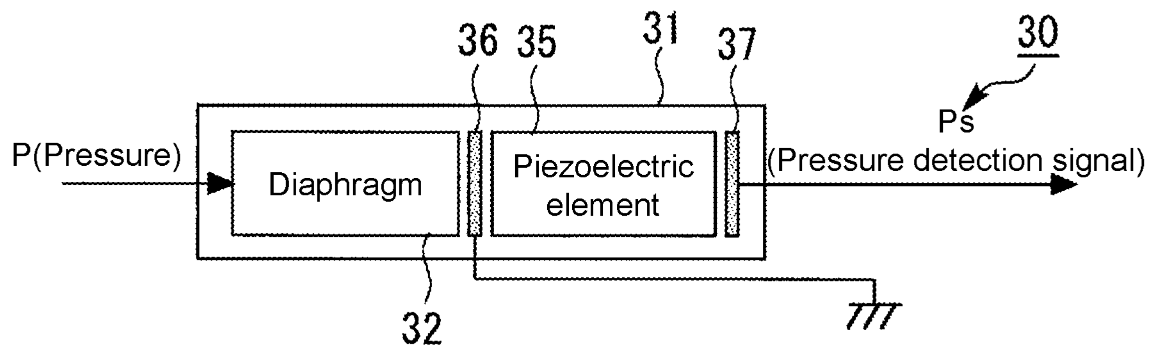
FIG. 4 is a schematic diagram illustrating a configuration of a pressure sensor 30.

FIG. 4 is a schematic diagram illustrating a configuration of the pressure sensor 30. A diaphragm 32 receiving a pressure P and a piezoelectric element 35 sandwiched by a pair of electrodes 36 and 37 are implemented in a cylindrical housing 31 of the pressure sensor 30. The electrode 36 is connected with a grounded lead wire, and the other electrode 37 is connected with a lead wire for transmitting a pressure detection signal Ps of the pressure sensor 30 to a next stage. The piezoelectric element 35 generates and outputs a charge responsive to a received pressure strength. The piezoelectric element 35 is made of, for example, a dielectric material such as zinc oxide (ZnO).

With the diaphragm 32 supplying a pressure to the piezoelectric element 35 in response to the received pressure strength, the piezoelectric element 35 generates a charge corresponding to the supplied pressure and outputs the charge to the charge amplifier 210 of the next stage. Thus, the charge corresponding to the pressure P is transmitted to the charge amplifier 210 as the pressure detection signal Ps.

Figure 5:
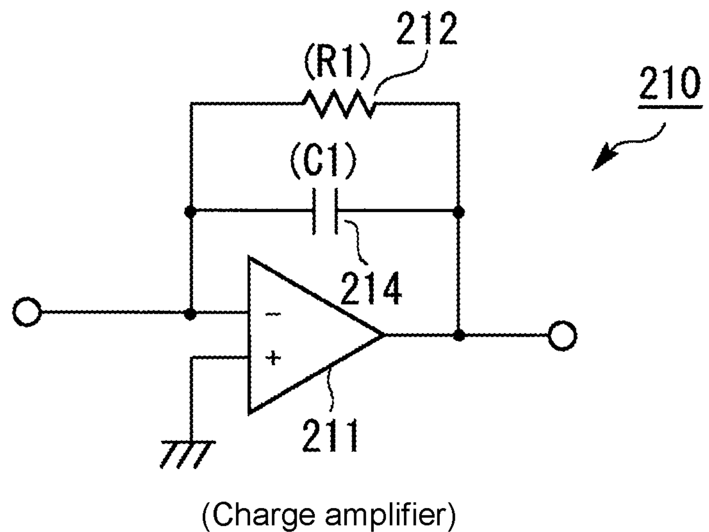
FIG. 5 is a diagram illustrating a configuration of a charge amplifier 210.

FIG. 5 is a diagram illustrating a configuration of the charge amplifier (current amplifier) 210. The charge amplifier 210 is configured so that a parallel circuit in which a resistor 212 of a resistance value R1 and a capacitor 214 of a capacitance C1 are connected in parallel is in negative feedback connection with an operational amplifier 211. A non-inverting terminal of the operational amplifier 211 is grounded and in a virtual grounded state. In addition, the charge amplifier 210 may also be configured so that only the capacitor 214 is in negative feedback connection with the operational amplifier 211.

Since the input impedance of the operational amplifier 211 is ideally infinitely large, the charge from the piezoelectric element 35 is accumulated in the capacitor 214, and a voltage responsive to the accumulated charge is generated at two ends of the capacitor 214. Thus, the charge amplifier 210 accumulates the charge generated at the piezoelectric element 35 and outputs a corresponding voltage signal V ($Q=C1\cdot V$, where "Q" indicates the charge, and "V" indicates the output voltage).

In addition, an analog output signal from the charge amplifier 210 is input to the AD converting part 205 shown in FIG. 3 and the AD converting part 205 converts the input analog signal into a digital signal. The differential processing part 230 performs a differential process with respect to the digital signal subjected to analog-digital conversion by the AD converting part 205. In the differential process performed by the differential processing part 230, the slopes of signals input to the differential processing part 230 are sequentially obtained.

By setting the digital sampling period by the AD converting part 205 as "T" and signals at lapsed times "$T, 2\cdot T, 3\cdot T, \ldots, (n-1)\cdot T, n\cdot T$" as "$y(1), y(2), y(3), \ldots, y(n-1), y(n)$", the differential process is realized by obtaining "$y(2)-y(1), y(3)-y(2), \ldots, y(n)-y(n-1)$". In other words, the differential process performed by the differential processing part 230 corresponds to sequentially obtaining the differences of the digital signals.

The low-pass filter part 240 extracts a drift component of the differential signal subjected to the differential process by the differential processing part 230. The low-pass filter 240 can be realized by a low-pass filter extracting drift components which change slowly in differential signals.

As an example of the low-pass filter, a "movement average filter" can be adopted. The "movement average filter can obtain "$(y(1)+y(2)+y(3))/3, \ldots, (y(n-2)+y(n-1)+y(n))/3$" by setting the digital sampling period as "T" and the signals in the lapsed times "$T, 2\cdot T, 3\cdot T, \ldots, (n-1)\cdot T, n\cdot T$" as "$y(1), y(2), y(3), \ldots, y(n-2), y(n-1), y(n)$". Accordingly, the differential processing part 230 and the low-pass filter part 240 operate in conjunction to function as a drift component extracting part extracting the drift component of the piezoelectric element 35.

Namely, the movement average filter sequentially obtains the average value of previous and next n digital signals (n being an integer of 3 or more) including a digital signal of interest. When the value of n is a greater value, the cut-off frequency can be decreased. For example, by linearly changing the value of n of the movement average filter in response to the engine rotation speed, a stable signal processing can be realized regardless of the peak value. As a specific example, the engine speed and n can be set to be proportional.

The drift correcting part 250 outputs a correction signal to be fed back to the input side of the charger amplifier 210. More specifically, the drift correcting part 250 performs feedback control by performing digital-analog conversion on a voltage signal equivalent a difference between a predetermined target value and an extracted signal of the low-pass filter part 240, setting a current signal corresponding to the analog voltage signal after the digital-analog conversion as the correction signal, and applying the current signal to the input side of the charge amplifier.

(Configuration of the Digital Signal Processing Part 220)

Figure 6:
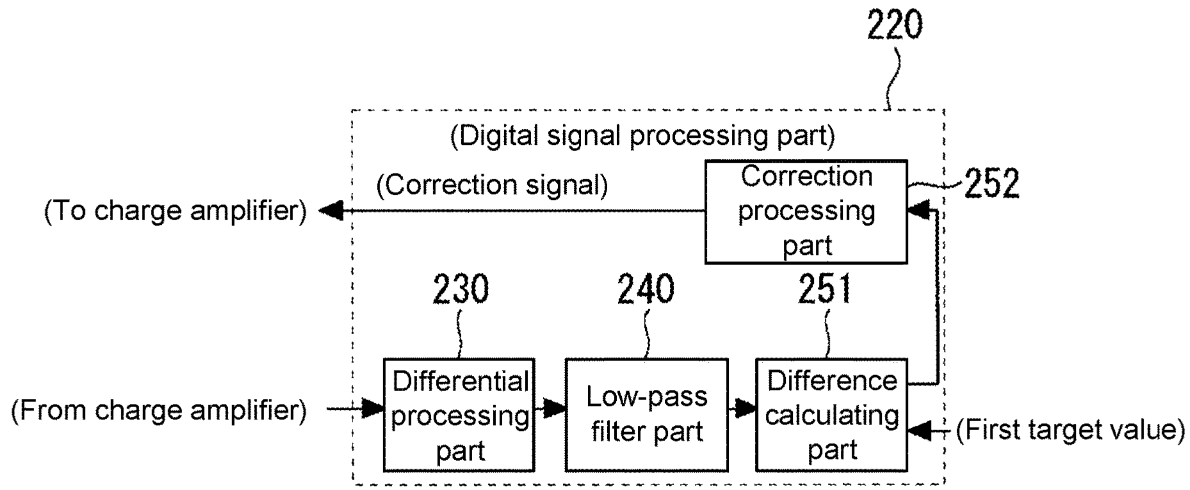
FIG. 6 is diagram illustrating a configuration of a digital signal processing part 220.

FIG. 6 is diagram illustrating a configuration of a digital signal processing part 220. The configuration example is characterized in that drift is removed by only differential control (D control). In addition, in the following descriptions, the illustration of the AD converting part 205 disposed at a previous stage of the digital signal processing part 220 described with FIG. 6, FIG. 8, and FIG. 9 will be omitted.

The digital signal processing part 220 shown in FIG. 6 has the differential processing part 230, the low-pass filter part 240, a difference calculating part 251, and a correction processing part 252. The drift correcting part 250 shown in FIG. 3 corresponds to the difference calculating part 251 and the correction processing part 252.

Then, the low-pass filter part 240 outputs an extracted signal obtained by extracting the drift component based on the differential signal output from the differential processing part 230 to the difference calculating part 251. The difference calculating part 251 obtains a difference between a predetermined first target value and the extracted signal and outputs the difference to the correction processing part 252.

Figure 7:
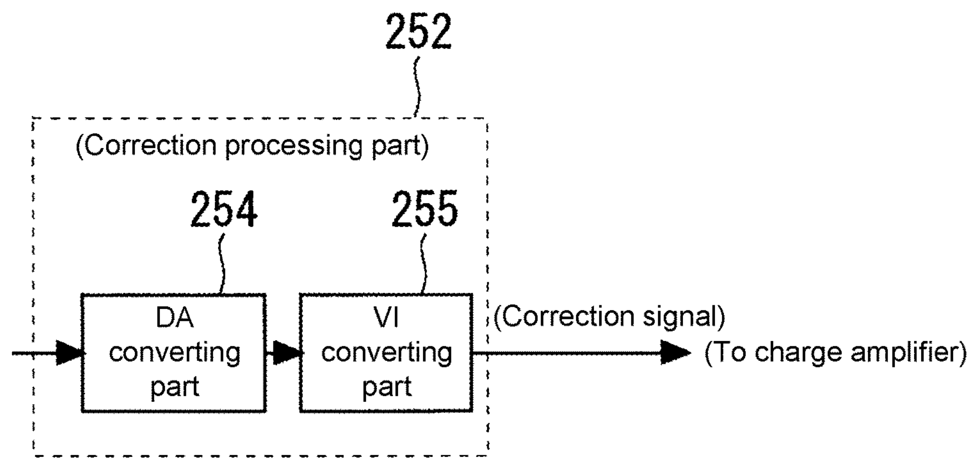
FIG. 7 is a diagram illustrating a configuration of a correction processing part 252.

FIG. 7 is a diagram illustrating a configuration of the correction processing part 252. The correction processing part 252 has a DA (digital to analog) converting part 254 and a VI converting part 255. The DA converting part 254 performs digital-analog conversion on the difference signal output from the difference calculating part 251 and outputs the converted difference signal to the VI converting part 255. The VI converting part 255 performs voltage-current conversion (VI conversion) on the difference signal subjected to the digital-analog conversion and applies the current signal after the voltage-current conversion to the input side of the charge amplifier 210 as the correction signal. The VI converting part 255 may also be disposed outside the digital signal processing part 220 and immediately before the charge amplifier 210.

Namely, the difference signal is subjected to digital-analog conversion by the DA converting part 254, and the VI converting part 255 performs VI conversion on the current signal corresponding to the voltage signal subjected to digital conversion and outputs the converted signal to the charge amplifier 210.

Thus, the digital signal processing part 220 shown in FIG. 6 performs feedback control by differential control (D control) using the differential processing part 230, the difference calculating part 251, and the correction processing part 252.

(Configuration of the Digital Signal Processing Part 220 of Another Aspect)

Figure 8:
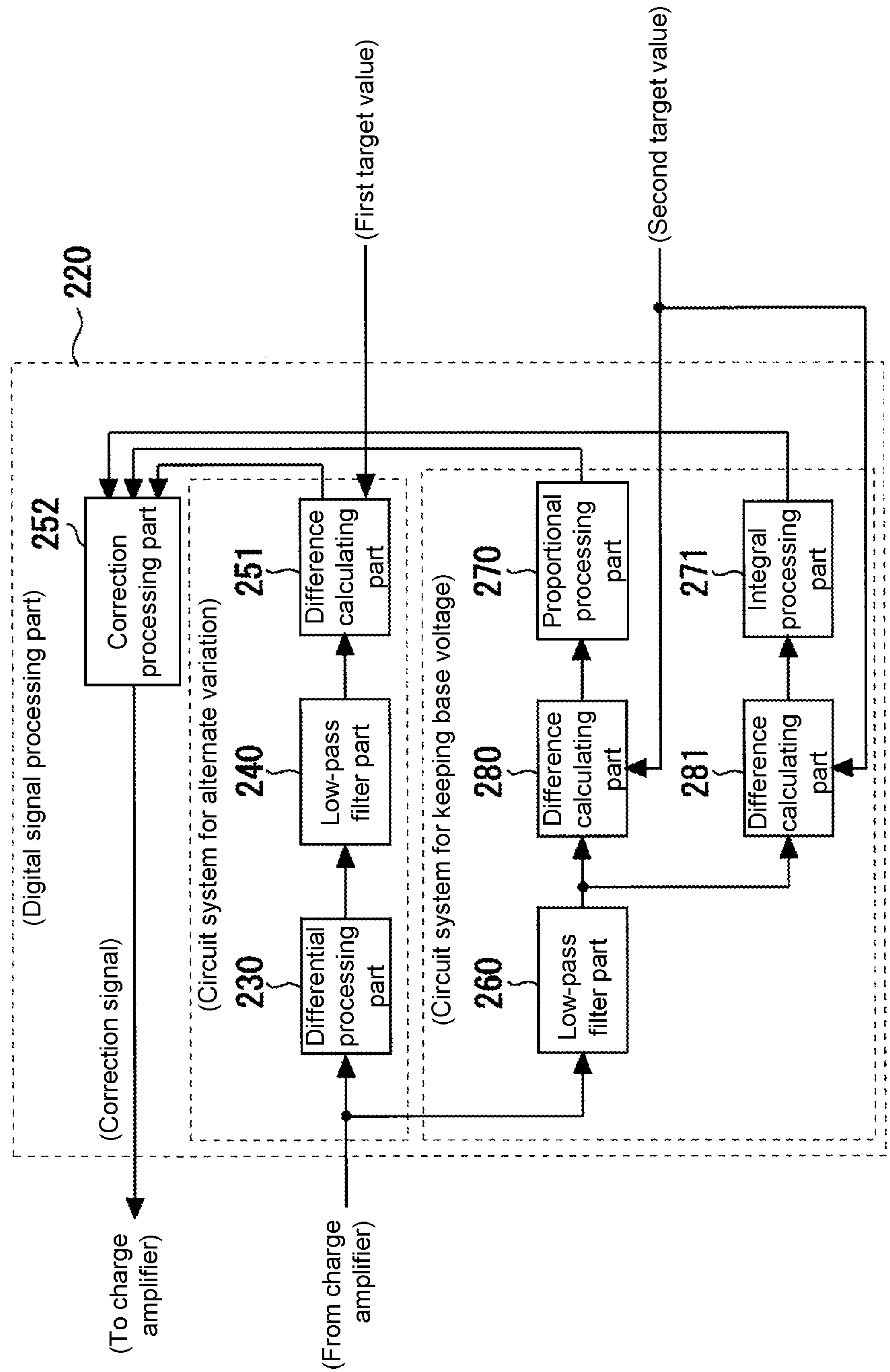
FIG. 8 is diagram illustrating a configuration of the digital signal processing part 220 of another aspect.

FIG. 8 is diagram illustrating a configuration of the digital signal processing part 220 of another aspect. The configuration is characterized in removing the drift and keeping the baseline of the pressure detection signal constant by differential control (D control), proportional control (P control), and integral control (I control), i.e., PID control.

Compared to the configuration of FIG. 6, the digital signal processing part 220 shown in FIG. 8 further includes a low-pass filter part 260, a difference calculating part 280, a difference calculating part 281, a proportional processing part 270, and an integral processing part 271.

The low-pass filter part 260 outputs a signal obtained by extracting a predetermined low frequency band component of the voltage signal output from the charge amplifier 210. The difference calculating part 280 obtains a difference between a predetermined second target value and the output signal of the low-pass filter part 260, and outputs a difference signal indicating the obtained difference to the proportional processing part 270.

Similarly, the difference calculating part 281 obtains the difference between the predetermined second target value and the output signal from the low-pass filter part 260, and outputs a difference signal indicating the obtained difference to the integral processing part 271. The differential processing part 230, the low-pass filter part 240, and the difference calculating part 251 shown in FIG. 8 are the same as those shown in FIG. 6.

The proportional processing part 270 outputs a proportional signal obtained by multiplying the difference signal output from the difference calculating part 280 by a proportional constant to the correction processing part 252. The integral processing part 271 outputs an integral signal obtained by performing an integral process on the difference signal output from the difference calculating part 281 to the correction processing part 252.

Additionally, a configuration where one of the difference calculating part 280 and the difference calculating part 281 is disposed and the output thereof serves as inputs to both the proportional processing part 270 and the integral processing part 271 can be adopted.

Figure 9:
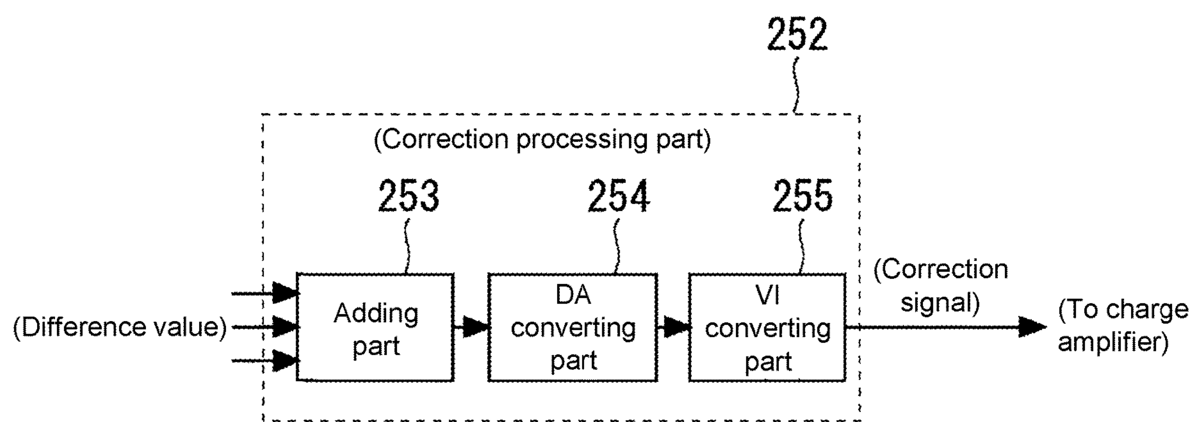
FIG. 9 is a diagram illustrating a configuration of the correction processing part 252 of another aspect.

FIG. 9 is a diagram illustrating a configuration of the correction processing part 252 of another aspect. The correction processing part 252 has an adding part 253, the DA converting part 254, and the VI converting part 255. The adding part 253 sets an addition signal by adding the input signal, and the DA converting part 254 performs digital-analog conversion on the addition signal and outputs the converted addition signal to the VI converting part 255.

The VI converting part 255 performs voltage-current conversion (VI conversion) on the addition signal subjected to the digital-analog conversion and applies the current signal after the voltage-current conversion to the input side of the charge amplifier 210 as the correction signal.

That is, the correction processing part 252 obtains the addition signal by adding the signals from the difference calculating part 251, the proportional processing part 270, and the integral processing part 271, performs digital-analog conversion on the obtained addition signal, and feeds the current signal subjected to the VI conversion with respect to the signal subjected to digital-analog conversion back to the input side of the charge amplifier 210 as the correction signal.

By setting the digital sampling period as "T" and signals in lapsed times "$T, 2\cdot T, 3\cdot T, \ldots, (n-1)\cdot T, n\cdot T$" as "$y(1), y(2), y(3), \ldots, y(n-1), y(n)$", the integral process is realized by obtaining "$y(1)\cdot T$, $y(1)\cdot T+y(2)\cdot T$, $y(1)\cdot T+y(2)\cdot T+y(3)\cdot T, \ldots, y(1)\cdot T+y(2)\cdot T+y(3)\cdot T+\ldots+y(n)\cdot T$". In other words, the integral process performed by the integral processing part 271 corresponds to sequentially obtaining the sums of digital signals.

Thus, the digital signal processing part 220 shown in FIG. 8 is configured to, in addition to performing feedback control by differential control (D control), perform feedback control by proportional control (P control) and integral control (I control) by using the proportional processing part 270, the integral processing part 271, the difference calculating part 280, the difference calculating part 281, and the correction processing part 252. Thus, by performing proportional control (P control) and integral control (I control) in addition to differential control (D control), the convergence toward the target value can be facilitated and the controllability can be further improved.

A "circuit system for alternate variation" formed by the differential processing part 230 and the difference calculating part 251 has an effect of removing the alternately varying drift component, and a "circuit system for keeping base voltage" formed by the proportional processing part 270, the integral processing part 271, the difference calculating part 280, and the difference calculating part 281 has an effect of keeping a baseline which is a voltage formed as the base of the pressure detection signal.

(Operation)

Figure 10:
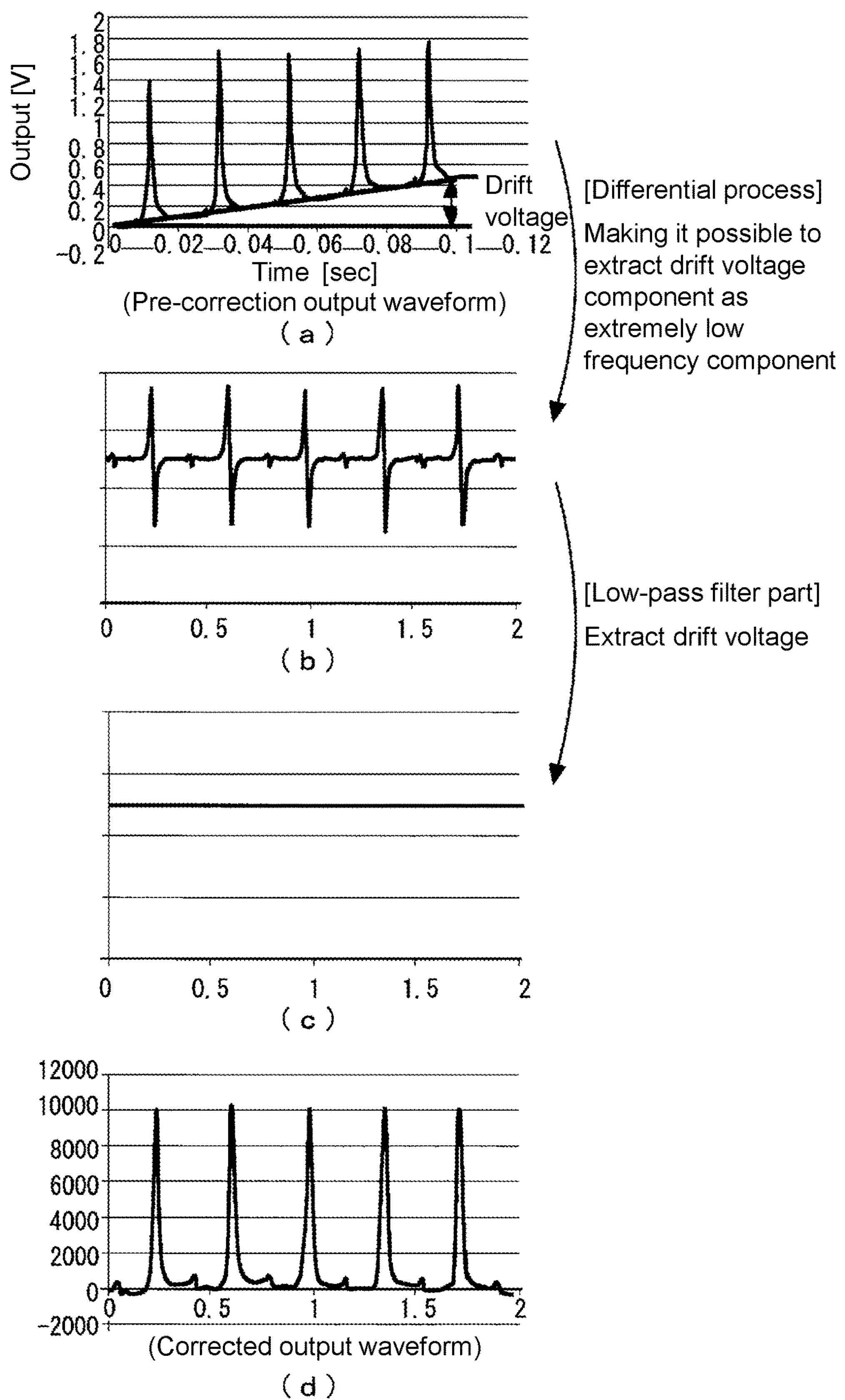
FIG. 10 is an explanatory diagram illustrating an operation of a pressure detection signal processing device 200.

Then, the operation of the digital signal processing part 220 is described with reference to FIG. 10. (a) of FIG. 10 illustrates an output signal (a signal at the location indicated by a symbol "a" of FIG. 3) from the charge amplifier 210. The output signal of the charge amplifier 210 is mixed with an integrated drift component and changes over time.

Then, with the differential processing part 230 performing a differential process with respect to the signal shown in (a) of FIG. 10, a signal (a signal at the location indicated by a symbol "b" of FIG. 3) shown in (b) of FIG. 10 is formed. Through functioning of the differential processing part 230, the drift component can be extracted. That is, by performing the differential process, the drift component before integration can be extracted.

Then, the low-pass filter part 240 attenuates a frequency component higher than the cut-off frequency in the signal shown in (b) of FIG. 10, and obtains a signal with very little alternate variation around the base line (a signal shown in (c) of FIG. 10: a signal at the location indicated by a symbol "c" of FIG. 3).

Then, the difference calculating part 251 extracts the value of the drift component as the difference between the first target value and the signal shown in (c) of FIG. 10. Here, the first target value is set as "0V", for example. That is, the drift component is substantially extracted by the processes performed by the differential processing part 230 and the low-pass filter part 240. In other words, any of the difference signal from the difference calculating part 251 and the extracted signal from the low-pass filter part 240 can be used as the input of the correction processing part 252 serving as the signal indicating the drift component. Therefore, it may also be configured that the difference calculating part 251 is omitted and the extracted signal from the low-pass filter part 240 is input to the correction processing part 252.

Then, (d) of FIG. 10 illustrates a signal (a signal at the location of a symbol (d) in FIG. 3) at the time when the correction signal for performing feedback control is obtained based on the extracted signal or the difference signal indicating the drift component and the obtained correction signal is fed back to the input side of the charge amplifier 210. According to the signal indicated in (d) of FIG. 10, it is known that the drift component is removed.

In addition, with the proportional processing part 270 performing a proportional process and the integral processing part 271 performing an integral process, the baseline voltage of the output signal from the charge amplifier 210 is corrected so as to become the set second target value. For example, by setting the second target value as "0.5 (V)", the baseline voltage of the output signal from the charge amplifier 210 becomes "0.5 (V)". The parameters necessary for the PID control, such as the first target value, the second target value, etc., are stored in the non-volatile memory 136 in advance in a non-volatile manner.

According to the embodiment described above, the charge amplifier 210 accumulates the charge generated by the piezoelectric component 35 in response to the received pressure and outputs the corresponding voltage signal, and the differential processing part 230 outputs the differential signal in which the voltage signal is subjected to the differential process. Then, the low-pass filter part 240 extracts the drift component based on the differential signal.

Then, by obtaining the current signal for reducing the extracted drift component and feeding the obtained current signal as the correction signal back to the input side of the charge amplifier 210, the drift correcting part 250 can remove the drift of the piezoelectric element 35 and obtain a pressure detection signal with good accuracy.

In addition, it is confirmed that, by disposing a slice part having a slicing function for suppressing a signal of a exceeding portion to a predetermined level between the previous stage of the differential processing part 230 and the low-pass filter part 260 and the charge amplifier 210 when the input exceeds the predetermined level, stabilized drift extraction can be performed regardless of the peak value. The slice part can be realized by a circuit element such as a Zener diode, etc., or a program executing a clipping process, etc., for example.

In addition, according to the pressure detection signal processing device 200 of the disclosure, since the pressure detection signal in the ECU 100, etc., can be processed at high accuracy, the combustion abnormality detection such as misfire detection can be performed at high accuracy based on the output signal from the pressure detection signal processing device 200.

In addition, the above configuration of the correction processing part 252 is merely an example. For example, it may also be that the drift component (the value of the extracted signal or the difference signal) and a current value of the correction signal corresponding to the drift component are associated and registered in advance in the table 134, and the correction processing part 252 is provided with a current control part (to be described in subsequent paragraphs with reference to (c) of FIG. 16). Then, a configuration in which the current control part reads the current value corresponding to the drift component from the table 134 and feeds the correction signal as the read current value back to the input side of the charge amplifier can also be adopted.

It may also be that the structure of the table 134 is constructed for each of the difference signal (or extracted signal), the proportional signal, and the integral signal, and the current control part reads the current value corresponding to the value of each signal from each table 134 and feeds the correction signal formed as a value obtained by adding the read current values by the adding part 253 back to the input side of the charge amplifier. In addition, it may also be that the added value and the current value corresponding to the added value are associated and registered in advance in the table 134, and the current control part feeds the current value corresponding to the added value indicated by the addition signal from the addition part 253 back to the input side of the charge amplifier 210 as the correction signal.

The above describes the pressure detection signal processing device 200 performing the signal processing for increasing the pressure detection accuracy with respect to the pressure signal from the pressure sensor 30. In the following, an example of misfire detection will be described.

(Principle of Misfire Detection)

First of all, the principle for detecting a misfire occurrence is described with reference to FIG. 11, FIG. 12, FIG. 13, and FIG. 14.

Figure 11:
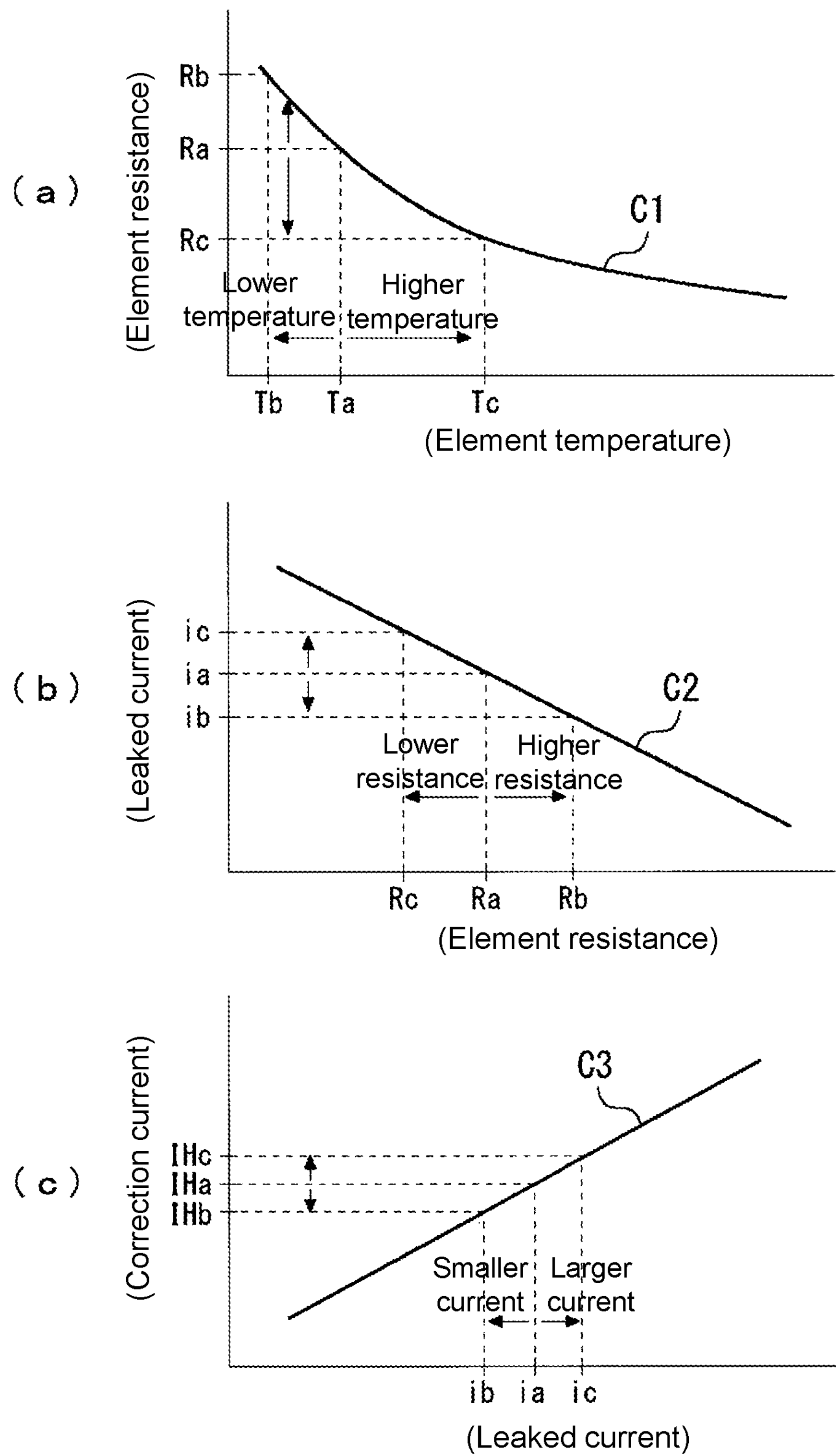
FIG. 11 is an explanatory diagram for the principle of misfire detection.

(a) of FIG. 11 is a diagram illustrating a relationship between element temperature and element resistance of the piezoelectric element 35. (b) of FIG. 11 is a diagram illustrating a relationship between element resistance and leaked current of the piezoelectric element 35. (c) of FIG. 11 is a diagram illustrating a relationship between leaked current and correction current (correction signal) of the piezoelectric element 35.

The piezoelectric element 35 shown in (a) of FIG. 11 exhibits a property of negative temperature coefficient (NTC). Namely, the piezoelectric element 35 has a property that, as the element temperature, which is the temperature of the element, increases, the resistance value (element resistance) decreases.

As shown in (a) of FIG. 11, as the element temperature of the piezoelectric element 35 increases from "Ta" to "Tc", the element resistance decreases from "Ra" to "Rc". On the other hand, as the element temperature of the piezoelectric element 35 decreases from "Ta" to "Tb", the element resistance increases from "Ra" to "Rb".

Also, as shown in (b) of FIG. 11, as the element resistance of the piezoelectric element 35 increases from "Ra" to "Rb", the leaked current of the piezoelectric element 35 decreases from "ia" to "ib". On the other hand, as the element resistance of the piezoelectric element 35 decreases from "Ra" to "Rc", the leaked current of the piezoelectric element 35 increases from "ia" to "ic".

Moreover, as shown in (c) of FIG. 11, as the leaked current of the piezoelectric element 35 increases from "ia" to "ic", the correction current increases from "IHa" to "IHc". On the other hand, as the leaked current of the piezoelectric element 35 decreases from "ia" to "ib", the correction current decreases from "IHa" to "IHb".

According to the above, as the element temperature of the piezoelectric element 35 increases, the correction current increases because the leaked current of the piezoelectric element 35 increases. On the other hand, as the element temperature of the piezoelectric element 35 decreases, the correction current decreases because the leaked current of the piezoelectric element 35 decreases.

Namely, the correction current increases as the element temperature of the piezoelectric element 35 increases, while the correction current decreases as the element temperature of the piezoelectric element 35 decreases. As a result, since the element temperature and the correction current uniquely correspond to each other, the variation of the element temperature of the piezoelectric element 35 is known if the variation of the value of the correction current is known. Here, the correction current corresponds to the "correction signal" output from the drift correcting part 250 included in the pressure detection signal processing device 200.

Here, since the combustion in the combustion chamber 15 is not performed if a misfire occurs in the engine 1, the ambient temperature of the pressure sensor 30 disposed in a posture facing the combustion chamber 15 also decreases. As a result, the element temperature of the piezoelectric element 35 forming the pressure sensor 30 also decreases.

Then, as the element temperature of the piezoelectric element 35 decreases, the value of the correction signal output from the drift correcting part 250 decreases. Therefore, the misfire occurrence can be detected based on the variation of the value of the correction signal. The misfire occurrence here includes the case where the combustion is intermittently not performed and the case where the combustion is continuously not performed for a predetermined period.

Figure 12:
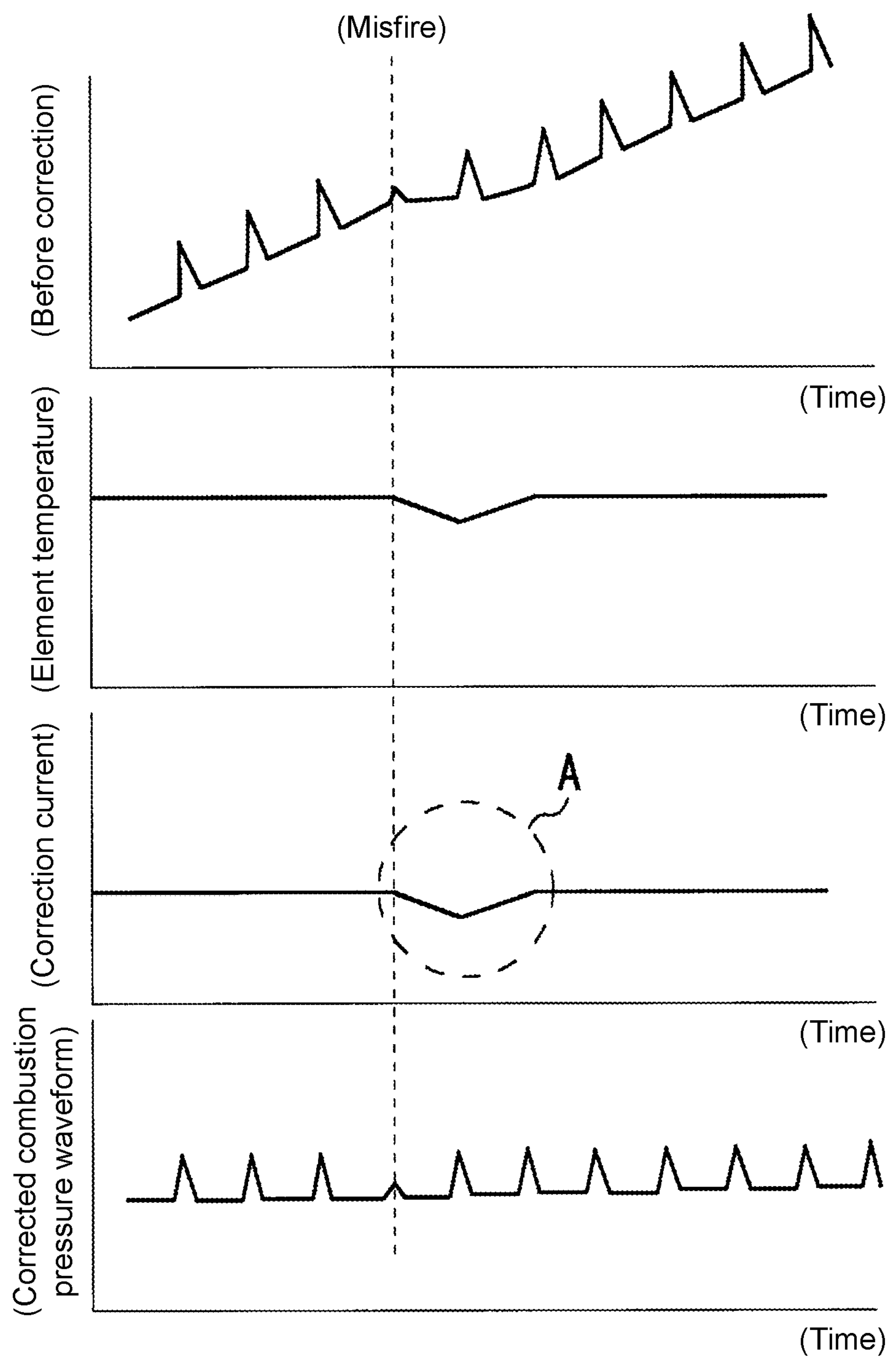
FIG. 12 is an explanatory diagram for the variation, etc., of signals when a misfire is detected.

FIG. 12 is an explanatory diagram indicating the variations of values, such as the correction signal, when a misfire occurs. The uppermost part of FIG. 12 illustrates the variation of the output signal "pre-correction signal" of the pressure sensor 30 over time, and the lowermost part of FIG. 12 illustrates the variation of the output signal "corrected combustion pressure waveform" from the pressure detection signal processing device 200 over time. As previously described, with the signal processing executed by the pressure detection signal processing device 200, the drift component in the "pre-correction signal" is removed, and the "corrected combustion pressure waveform" is formed. The output signal "pre-correction signal" is the output signal of the charge amplifier 210 before the correction, and the output signal "corrected combustion pressure waveform" is the output signal of the charge amplifier 210 after the correction.

The second and third diagrams from the top of FIG. 12 are respectively the variation of "element temperature" of the piezoelectric element 35 over time and the variation of the value of "correction signal" over time. The "correction signal" corresponds to the correction signal corresponding to the drift correcting part 250.

As indicated by the circular dotted line of a symbol A in FIG. 12, since a non-combustion state occurs as the misfire occurs, the element temperature of the piezoelectric element 35 decreases in response to the misfire occurrence. As a result, it is known that the correction circuit (correction signal) decreases (with reference to the dotted line part of symbol A).

Figure 13:
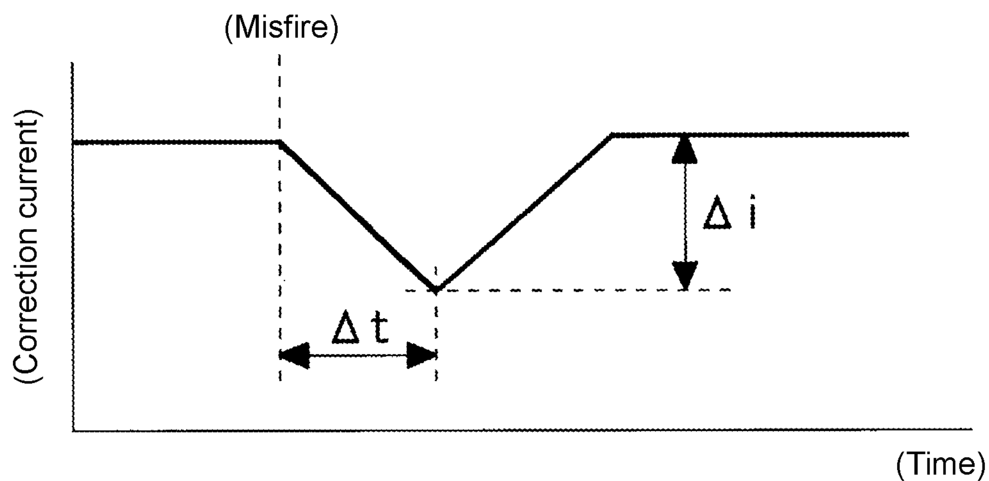
FIG. 13 is an enlarged view of a part A.

FIG. 13 is an enlarged view of the dotted line part of the symbol A in FIG. 12. As shown in FIG. 13, the value of the correction current (correction signal) decreases as the misfire occurs. When the combustion of the engine becomes normal and the misfire occurrence is resolved, the value of the correction current (correction signal) increases again.

Namely, in this example, the value of the correction current (correction signal) changes toward the negative direction and has a minimum value. As shown in FIG. 13, by setting the variation amount of the correction current (correction signal) in the negative direction as "$\Delta i$", the occurrence of a misfire can be detected based on "$\Delta i$" and a first predetermined value (a first misfire occurrence reference value set in advance).

More specifically, in the case where $\Delta i$ is higher than or equal to the first predetermined value, it can be detected that a misfire occurs. Accordingly, by evaluating the variation amount of the value of the correction signal, the occurrence of a misfire can be detected. The first predetermined value can be determined in advance based on the results of various simulations, experiments, etc.

In addition, the occurrence of a misfire can also be detected based on a temporal variation rate of the value of the correction signal and a second predetermined value (a second misfire occurrence reference value set in advance). More specifically, if the time required for the variation amount of the value of the correction current (correction signal) in the negative direction to reach $\Delta i$ is set as "$\Delta t$", in the case where "$\Delta i/\Delta t$" is greater than or equal to the second predetermined value, it can be detected that a misfire occurs.

Accordingly, by evaluating the temporal variation rate of the value of the correction signal, the occurrence of a misfire can be detected. Like the first predetermined value, the second predetermined value may be determined in advance based on the results of various simulations, experiments, etc.

In addition, regarding the method of detecting a misfire occurrence based on the variation of the value of the correction current (correction signal), a method of combining the evaluation of the variation amount and the evaluation of the temporal variation rate can be adopted, or other methods can also be adopted.

Figure 14:
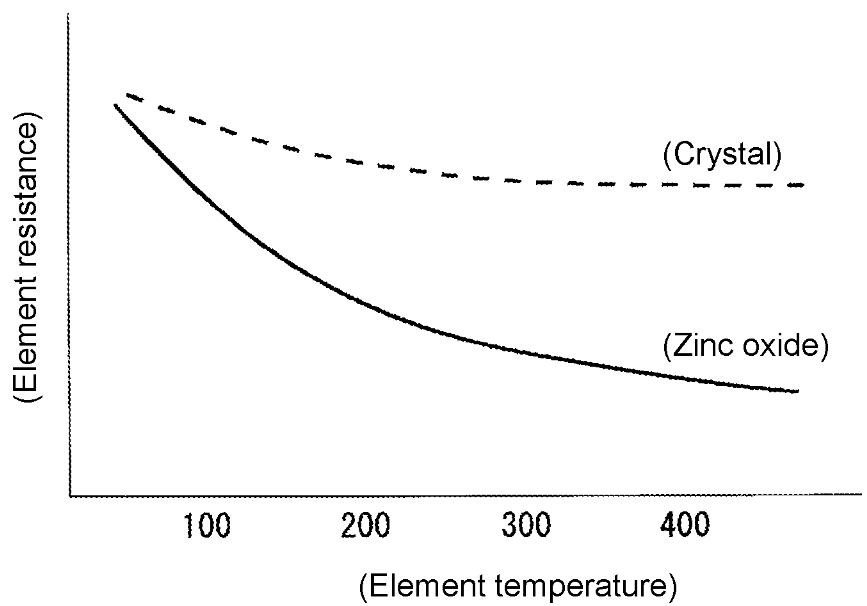
FIG. 14 is an explanatory diagram for an example of temperature properties of a piezoelectric element.

FIG. 14 is a diagram comparing the temperature property of zinc oxide (ZnO), which is an example of the piezoelectric element 35, and the temperature property of crystal, which is another piezoelectric element. The piezoelectric element 35 has a negative temperature property where the element resistance decreases in response to the increase of the element temperature. Among the materials, zinc oxide (ZnO) has particularly high sensitivity from 100° C. to 200° C., for example, and is therefore suitable for the disclosure.

According to experiments, etc., it is confirmed that the temperature inside the combustion chamber 15 which the pressure sensor 30 including the piezoelectric element 35 is disposed to face is within the range from about 100° C. to about 200° C. The resistance value of ZnO changes significantly as the temperature changes within the temperature range. Therefore, as shown in FIG. 11, since the variation of the value of the correction current responsive to the variation of the element temperature is significant, a misfire occurrence can be more accurately detected.

(Misfire Detection Configuration)

Figure 15:
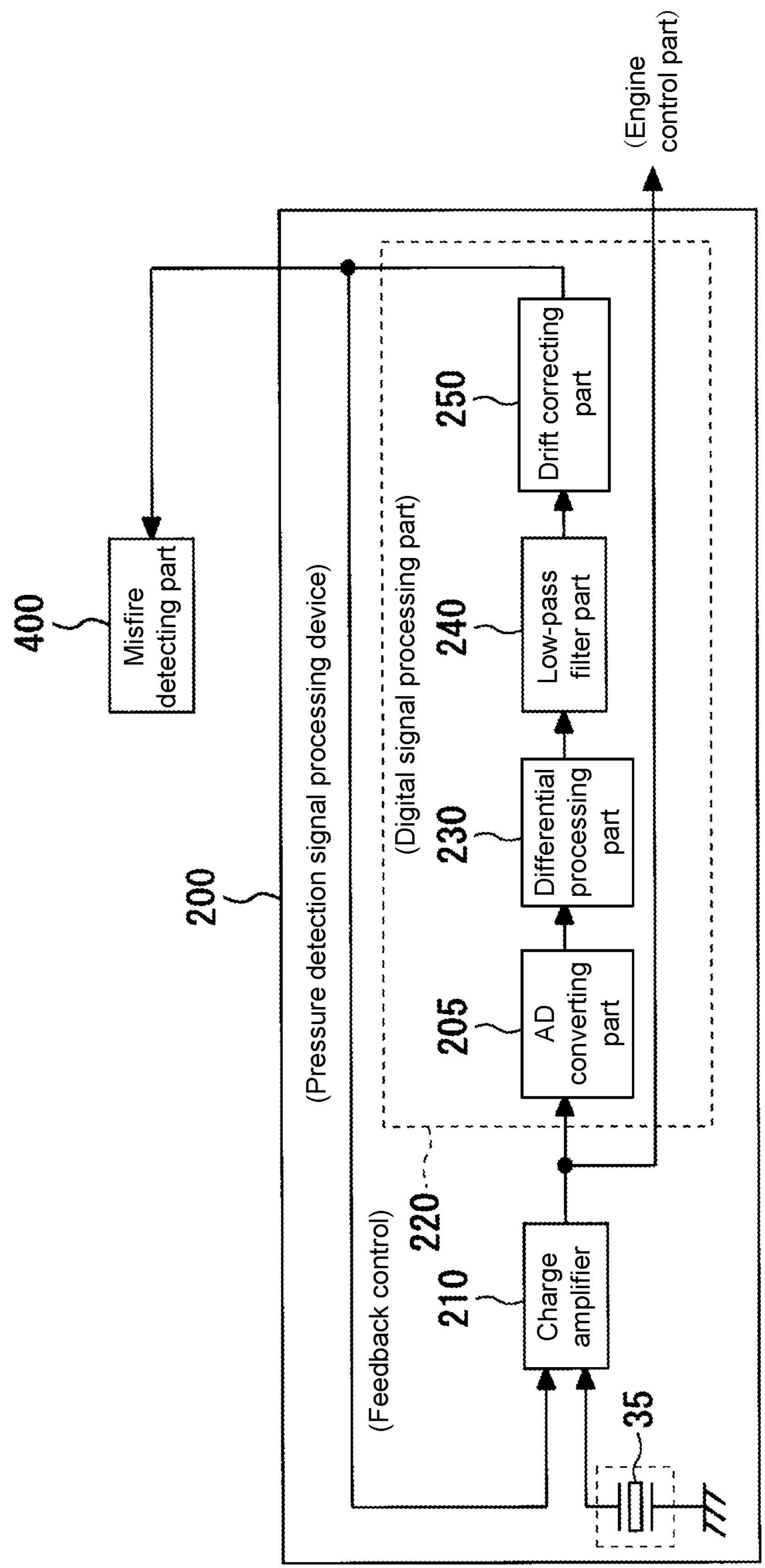
FIG. 15 is a diagram illustrating a configuration example of a combustion abnormality detecting device.

FIG. 15 is a diagram illustrating a configuration example of a combustion abnormality detecting device having a misfire detection function. The combustion abnormality detecting device has the charge amplifier 210, the digital signal processing part 220, and a misfire detecting part 400.

The digital signal processing part 220 has the AD converting part 205, the differential processing part 230, the low-pass filter part 240, and the drift correcting part 250, and is in a configuration where a correction signal from the drift correcting part 250 is fed back to the input side of the charge amplifier 210. The output signal of the charge amplifier 210 is supplied to the digital signal processing device 220 and the engine control part 150.

Figure 16:
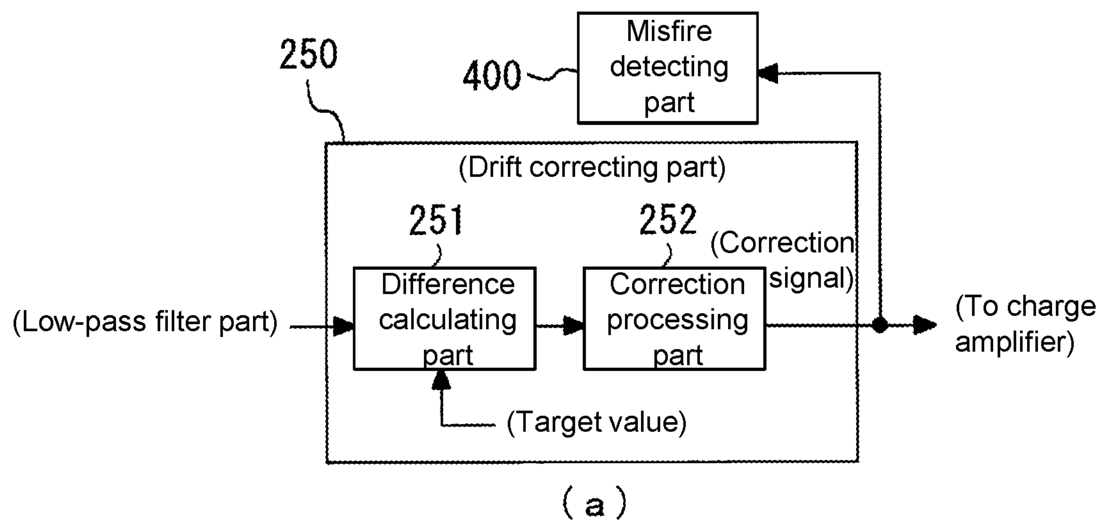
FIG. 16 is a diagram illustrating a configuration example of a misfire detecting part.
Figure 16:
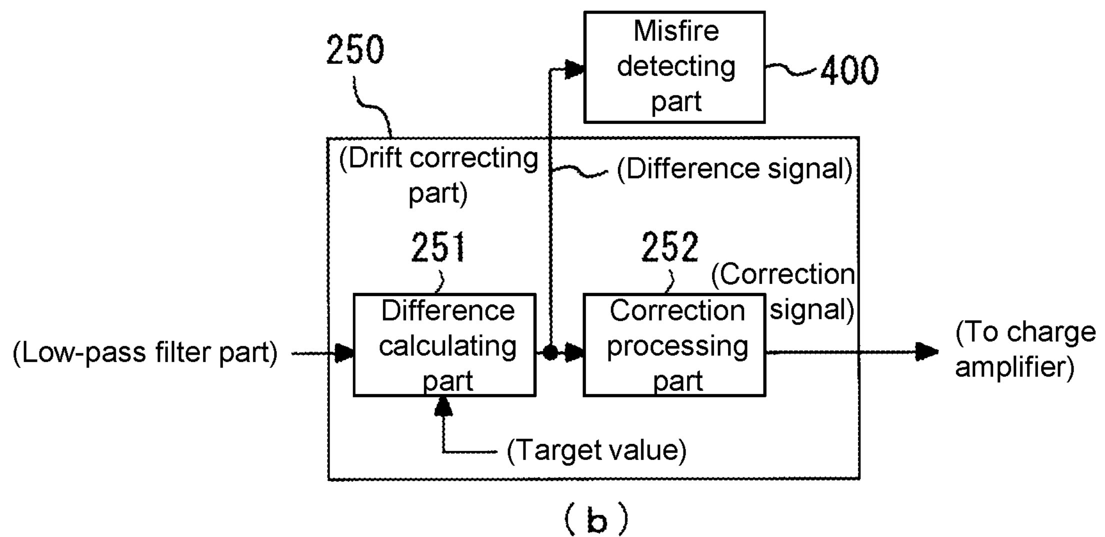
Figure 16:
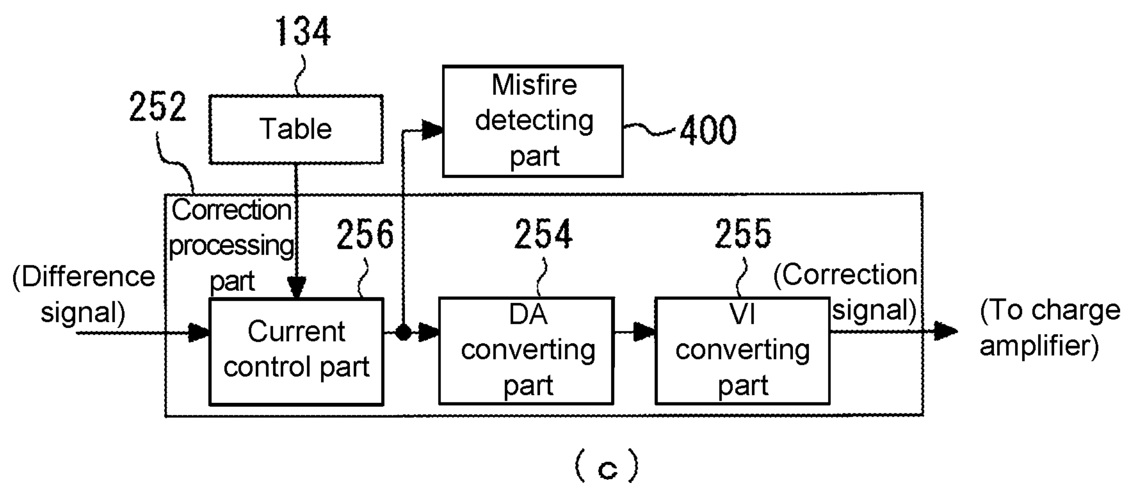

The configurations of the charge amplifier 210 and the digital signal processing part 220 are the same as those described above with reference to FIG. 3. The misfire detecting part 400 detects a misfire occurrence based on the correction signal from the drift correcting part 250. FIG. 16 is a diagram illustrating a configuration example of the misfire detecting part 400 and the drift correcting part 250.

(a) of FIG. 16 is a basic configuration example of the disclosure. The drift correcting part 250 in FIG. 16 has the difference calculating part 251 calculating the difference signal equivalent to the difference between the predetermined target value and the extracted signal by the low-pass filter part 240 and the correction processing part 252 generating the correction signal based on the difference signal and feeding the correction signal back to the input side of the charge amplifier 210.

In (a) of FIG. 16, the misfire detecting part 400 detects that a misfire occurs based on the correction signal from the drift correcting part 250 (more specifically, the correction processing part 252).

The drift correcting part 250 in (b) of FIG. 16 is the same as that indicated by the same reference symbol in (a) of FIG. 16, and the misfire detecting part 400 detects that a misfire occurs based on the difference signal from the difference calculating part 251. That is, in the configuration example, the misfire detecting part 400 detects that a misfire occurs based on the difference signal in place of the correction signal.

(c) of FIG. 16 is characterized in the configuration of the correction processing part 252 forming the drift correcting part 250. The correction processing part 252 has a current control part 256, the DA converting part, and the VI converting part 255.

The current control part 256 obtains the current value associated with the difference signal output from the difference calculating part 251 by referring to the registered contents of the table 134, and outputs the signal indicating the obtained current value to the DA converting part 254. The DA converting part 254 performs digital-analog conversion on the signal output from the current control part 256 and outputs the converted signal to the VI converting part 255. The VI converting part 255 performs voltage-current conversion (VI conversion) on the signal subjected to the digital-analog conversion and feeds the current signal after the voltage-current conversion back to the input side of the charge amplifier 210 as the correction signal. That is, the current value of the correction signal (current signal) is the current value obtained from the table 134.

In the configuration of (c) of FIG. 16, the misfire detecting part 400 detects the occurrence of a misfire based on the current value read from the table 134. That is, the misfire detecting part 400 performs misfire detection based on the signal output from the current control part 256. In addition, in the configuration of (c) of FIG. 16, misfire detection may be performed based on the signal obtained after the DA converting part 254 performs digital-analog conversion on the signal output from the current control part 256, and may also be performed based on the signal obtained after the VI converting part 255 performs VI conversion.

That is, the misfire detecting part 400 may also obtain the current value of the correction signal (current signal) from a signal indicated as a digital voltage value, obtain the current value of the correction signal (current signal) from a signal indicated as an analog voltage value, or obtain the current value of the correction signal (current signal) from the current value of the current signal itself.

Moreover, in the configuration of (c) of FIG. 16, misfire detection may also be performed based on the difference signal input to the current control part 256. Here, following the increase of the drift component, the value of the correction signal to be fed back increases in order to cancel the drift component. That is, the relationship between the drift component and the value of the correction signal is a relationship being proportional.

Therefore, in place of the correction signal, misfire detection may also be performed based on the difference signal indicating the extracted drift component. Moreover, as described above, the extracted drift component is not limited to the difference signal. Since the extracted drift component may also be indicated by the extracted signal, misfire detection may also be performed based on the extracted signal.

As described above, the misfire detecting part 400 can detect a misfire occurrence based on the correction signal from the drift correcting part 252, the difference signal from the difference calculating part 251, the signal indicating the current value of the correction signal from the current control part 256, etc.

For example, in the correction processing part 252 of the configuration shown in (a) of FIG. 16 to (c) of FIG. 16, the detection of a misfire occurrence may also be performed based on a signal (digital correction signal) obtained by performing AD conversion on the correction signal fed back from the VI converting part 255 to the charge amplifier 210, or the detection of a misfire occurrence may also be performed based on a signal obtained by further performing AD conversion on the signal from the DA converting part 254.

Moreover, in the case where the table 134 is constructed for the signal from each of the difference calculating part 251, the proportional processing part 270, and the integral processing part 271, the detection of a misfire occurrence may also be performed based on a value obtained by adding the current value read from each table 134. Furthermore, in the case where the table 134 associating the added value with the current value is constructed, the detection of a misfire occurrence may also be performed based on the current value corresponding to the added value indicated by the addition signal from the adding part 253.

In brief, the misfire detecting part 400 can detect a misfire occurrence based on the correction signal generated by the drift correcting part 250 or a signal (difference signal, etc.) generated based on the extracted drift component and serving to remove the drift component. That is, the signal for removing the drift component is equivalent to the signal for generating the correction signal, and includes a signal indicating the drift component itself and a signal generated based on the signal and having a relation with the correction signal.

(Misfire Detection Operation)

FIRST OPERATION EXAMPLE

Figure 17:
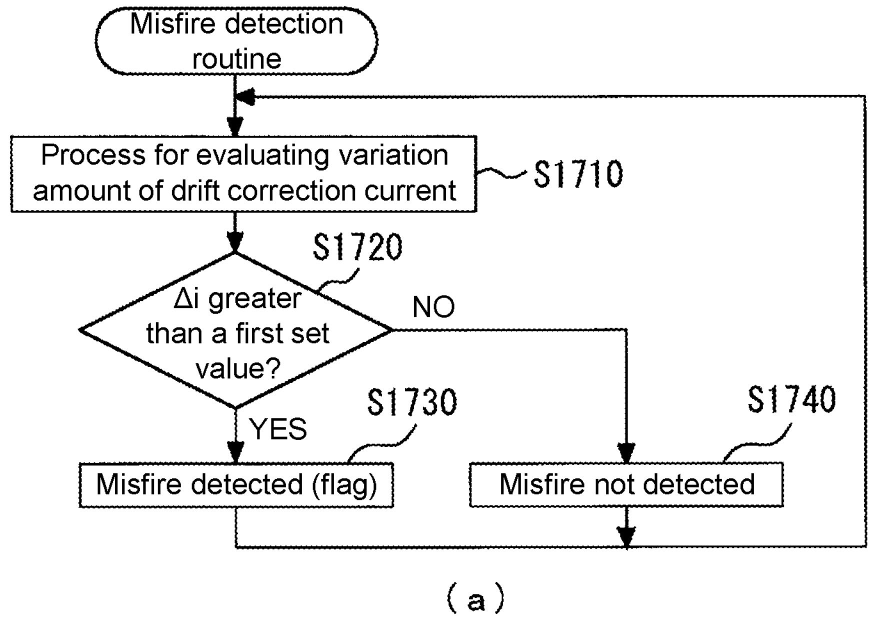
FIG. 17 is a flowchart illustrating an operation for detecting a misfire occurrence.
Figure 17:
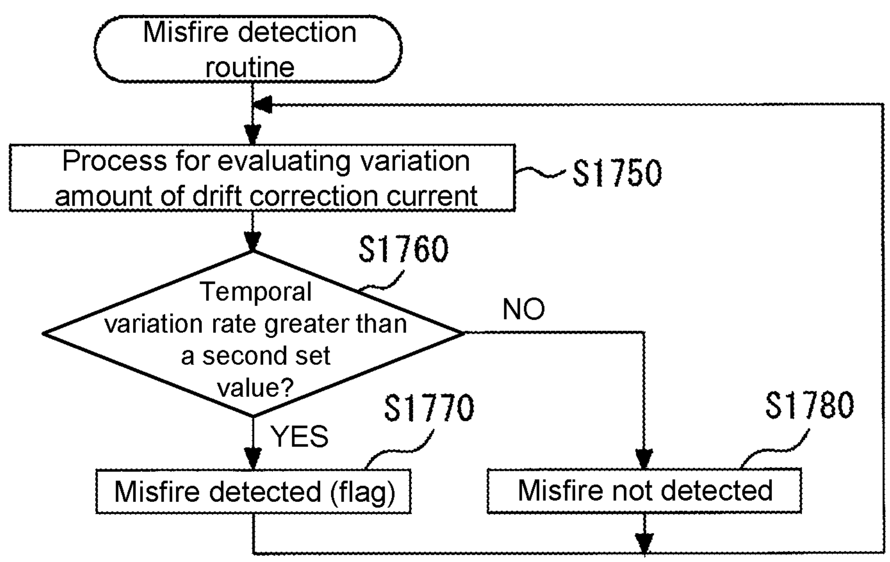

FIG. 17 is a flowchart illustrating the first operation example which the misfire detecting part 400 performs misfire detection. (a) of FIG. 17 shows the first operation example of a misfire detecting operation. The operation of the misfire detecting part 400 is described with reference to FIG. 13 and FIG. 17.

First of all, in Step S1710, the misfire detecting part 400 evaluates the variation amount of the correction current as an example of the correction signal. The misfire detecting part 400 obtains the variation amount ("Δi" of FIG. 13) in the negative direction in the variation of the value of the correction signal. The variation amount, for example, may be obtained by obtaining a variation amount from a variation starting point toward the negative direction to a minimum point (an extreme point at which the minimum value is captured) in the correction signal.

Then, in Step S1720, the misfire detecting part 400 determines whether the variation amount (Δi) is greater than or equal to a first set value. In the case of determining that the variation amount (Δi) is greater than or equal to the first set value (YES in Step S1720), the misfire detecting part 400 proceeds to Step S1730, considers a misfire occurrence as detected, executes control in correspondence with detecting the misfire occurrence, such as setting a flag, etc., and returns to Step S1710.

On the other hand, in Step S1720, in the case of determining that the variation amount (Δi) is not greater than or equal to the first set value (NO in Step S1720), the misfire detecting part 400 proceeds to Step S1740, sets "normal combustion" where a misfire occurrence is not detected, executes control corresponding to not detecting a misfire, and returns to Step S1710.

By evaluating the variation amount of the variation of the value of the correction signal as the above, the misfire detecting part 400 can perform misfire detection.

SECOND OPERATION EXAMPLE (b) of FIG. 17 shows the second operation example of the misfire detecting operation. First of all, in Step S1710, the misfire detecting part 400 evaluates the temporal variation rate of the correction current as an example of the correction signal. The misfire detecting part 400 obtains the temporal variation rate "Δi/Δt" of the value of the correction signal. The temporal variation rate is, for example, obtained by dividing the variation amount from the variation starting point toward the negative direction to the minimum point in the correction signal by the time during which the variation of the variation amount occurs.

Then, in Step S1760, the misfire detecting part 400 determines whether "Δi/Δt" is greater than or equal to a second set value. In the case of determining that "Δi/Δt" is greater than or equal to the second set value (YES in Step S1760), the misfire detecting part 400 proceeds to Step S1770, considers a misfire occurrence as detected, executes control in correspondence with detecting a misfire, such as setting a flag, etc., and returns to Step S1750.

On the other hand, in Step S1760, in the case of determining that "Δi/Δt" is not greater than or equal to the second set value (NO in Step S1760), the misfire detecting part 400 proceeds to Step S1780, sets "normal combustion" where a misfire occurrence is not detected, executes control corresponding to not detecting a misfire, and returns to Step S1750.

By evaluating the temporal variation rate of the value of the correction signal as the above, the misfire detecting part 400 can perform misfire detection.

Responsive to detecting a misfire in Step S1730 and S1770, the misfire detecting part 400 supplies a signal of this content to the engine control part 150, and the engine control part 150 receiving the signal can execute various engine control such as controlling fuel injection by the injector 40.

As described above, according to the embodiment of the disclosure, the drift correcting part 250 generates the correction signal for removing the drift component extracted by the differential processing part 230, the low-pass filter part 240 (drift component extracting part) and feeds the correction signal back to the input side of the charge amplifier 210, and the misfire detecting part 400 detects a misfire occurrence (combustion abnormality) based on the correction signal.

Therefore, by removing the drift of the pressure detection signal from the pressure sensor 30 including the piezoelectric element 35 to increase the pressure detection accuracy, the detection accuracy of misfire occurrence detection can be increased.

In addition, with the drift correcting part 250 including the table 134 in which the current value equivalent to the correction signal and the drift component (the value of the difference signal or the extracted signal) are associated and registered, obtaining the current value associated with the extracted drift component by referring to the registered contents of the table 134, and feeding the current signal equivalent to the obtained current value back to the input side of the charge amplifier 210, as well as the misfire detecting part 400 detecting the occurrence of a misfire based on the current signal, the pressure detection accuracy is increased by removing the drift of the pressure sensor 30. Accordingly, the detection accuracy of misfire detection can be increased.

In addition, with the drift correcting part 250 generating the correction signal for removing the extracted drift component and feeding the correction signal back to the input side of the charge amplifier 210 as well as the misfire detecting part 400 detecting a misfire occurrence based on the signal generated based on the extracted drift component and serving for generating the correction signal, the drift of the pressure sensor 30 is also removed to increase the pressure detection accuracy. Accordingly, the detection accuracy of misfire detection can be increased.

(Temperature Estimating Process)

According to the embodiment of the disclosure, in addition to misfire detection, the temperature inside the combustion chamber 15 can also be estimated.

As described above, when the element temperature of the piezoelectric element 35 increases, the correction current increases, and when the element temperature of the piezoelectric element 35 decreases, the correction current decreases. Therefore, since the element temperature and the correction current uniquely correspond to each other, the variation of the element temperature of the piezoelectric element 35 is known if the variation of the value of the correction current is known.

In addition, since the pressure sensor 30 is disposed in a posture facing the inside of the combustion chamber 15, the element temperature of the piezoelectric element 35 corresponds to the temperature inside the combustion chamber 15. That is, since the correction signal from the drift correcting part 250 and the temperature inside the combustion chamber 15 are uniquely mapped, and the variation of the correction signal corresponds to the temperature variation, the temperature inside the combustion chamber 15 can be estimated based on the correction signal.

Accordingly, the ECU 100 may further have a temperature estimating part (not shown). The temperature estimating part estimates the temperature inside the combustion chamber 15 based on the correction signal output from the drift correcting part 250 of the pressure detection signal processing device 200.

More specifically, the temperature estimating part may be configured to refer to a table in which the correcting signal and the temperature are mapped and registered, obtain the temperature corresponding to the correction signal, and output the obtained temperature. The correction signal is the correction current, etc., as described above. In addition, the table is stored in the memory part 130, for example.

Then, the temperature estimating part outputs a temperature signal indicating the estimated temperature to the engine control part 150, etc. Therefore, the engine control part 150 does not require a temperature sensor while being able to perform various control using the temperature inside the combustion chamber 15 based on the temperature signal from the temperature estimating part.

At the time when the temperature estimating part estimates the temperature inside an internal combustion engine, other than the correction signal, the temperature estimation can also be performed based on a signal (difference signal, etc.), which is a signal serving for generating the correction signal such as the difference signal, that is generated based on the extracted drift component and serves to remove the drift component.

The operations described above can be realized by a processor, such as a CPU, a digital signal processor (DSP), etc., executing a program. In addition, the disclosure can also provide a non-volatile recording medium in which the program is recorded. Examples of the non-volatile recording medium in which the program is recorded includes semiconductor elements such as ROM, etc. The type of the recording medium is not particularly limited as long as the program stored therein can be read with a reading means and executed on a computer.

Moreover, while in the engine control system 300 of FIG. 1, the pressure detection signal processing device 200 and the misfire detecting part 400 are configured as being disposed inside the ECU 100, it may also be a system configuration where the ECU 100 and the pressure detection signal processing part 200 as well as the misfire detecting part 400 are separately disposed, and the pressure detection signal from the pressure detection signal processing device 200 and a signal indicating the misfire detection result from the misfire detecting part 400 are supplied to the ECU 100.

What is claimed is:

1. A combustion abnormality detecting device, detecting an occurrence of a combustion abnormality of an internal combustion engine based on a signal obtained by performing a signal processing with respect to an output signal of a pressure sensor comprising a piezoelectric element generating a charge responsive to a received pressure, the combustion abnormality detecting device comprising:

a charge amplifier, outputting a voltage signal corresponding to the charge;

a drift component extracting part, extracting a drift component of the piezoelectric element based on the voltage signal;

a drift correcting part, generating a correction signal for removing the extracted drift component and feeding back the correction signal to an input side of the charge amplifier; and a combustion abnormality detecting part, detecting that the combustion abnormality occurs based on the correction signal.

2. The combustion abnormality detecting device as claimed in claim 1, wherein the combustion abnormality detecting part detects an occurrence of a misfire as the combustion abnormality based on a variation of a value of the correction signal.

3. The combustion abnormality detecting device as claimed in claim 2, wherein the combustion abnormality detecting part detects the occurrence of the misfire based on a variation amount of the value of the correction signal in a negative direction and a first misfire occurrence reference value set in advance.

4. The combustion abnormality detecting device as claimed in claim 2, wherein the combustion abnormality detecting part detects the occurrence of the misfire based on a temporal variation rate of the value of the correction signal and a second misfire occurrence reference value set in advance.

5. The combustion abnormality detecting device as claimed in claim 1, wherein a resistance value of the piezoelectric element has a negative temperature property.

6. The combustion abnormality detecting device as claimed in claim 5, wherein a material of the piezoelectric element is zinc oxide.

7. The combustion abnormality detecting device as claimed in claim 1, wherein the drift component extracting part comprises:

a differential processing part, performing a differential process with respect to the voltage signal; and a low-pass filter, extracting a low frequency band component of a signal subjected to the differential process.

8. The combustion abnormality detecting device as claimed in claim 1, wherein the drift correcting part comprises a registering part associating a current value of the correction signal to be fed back in the drift component with each of a plurality of values which the drift component is able to obtain and registering the current value, obtains the current value associated with the extracted drift component by referring to registered contents of the registering part, and feeds back a current signal to the input side of the charge amplifier, wherein the current signal is equivalent to the obtained current value and regarded as the correction signal, and wherein the combustion abnormality detecting part detects the occurrence of the misfire based on the current signal.

9. The combustion abnormality detecting device as claimed in claim 1, further comprising a temperature estimating part estimating a temperature inside the internal combustion engine based on the correction signal.

10. A combustion abnormality detecting device, detecting an occurrence of a combustion abnormality of an internal combustion engine based on a signal obtained by performing a signal processing with respect to an output signal of a pressure sensor comprising a piezoelectric element generating a charge responsive to a received pressure, the combustion abnormality detecting device comprising:

a charge amplifier, outputting a voltage signal corresponding to the charge;

a drift component extracting part, extracting a drift component of the piezoelectric element based on the voltage signal;

a drift correcting part, generating a correction signal for removing the extracted drift component and feeding back the correction signal to an input side of the charge amplifier; and a combustion abnormality detecting part, detecting that the combustion abnormality occurs based on a signal generated based on the extracted drift component and serving for generating the correction signal.

11. The combustion abnormality detecting device as claimed in claim 10, wherein the combustion abnormality detecting part detects an occurrence of a misfire as the combustion abnormality based on a variation of a value of the signal generated based on the extracted drift component.

12. The combustion abnormality detecting device as claimed in claim 10, further comprising a temperature estimating part estimating a temperature inside the internal combustion engine based on the signal generated based on the extracted drift component.

13. A non-transitory computer-readable storage medium storing a program for realizing, in a combustion abnormality detecting device detecting an occurrence of a combustion abnormality of an internal combustion engine based on a signal obtained by performing a signal processing with respect to an output signal of a pressure sensor comprising a piezoelectric element generating a charge responsive to a received pressure, an extracting function, a correcting function and a detecting function, wherein the extraction function extracts a drift component of the piezoelectric element based on a voltage signal corresponding to the charge from a charge amplifier outputting the voltage signal, the correcting function generates a correction signal for removing the extracted drift component and feeds back the correction signal to an input side of the charge amplifier, and the detecting function detects the combustion abnormality based on the correction signal.

* * * * *